US012534156B2

(12) United States Patent
Luo et al.

(10) Patent No.: US 12,534,156 B2
(45) Date of Patent: Jan. 27, 2026

(54) ALL-TERRAIN VEHICLE

(71) Applicant: Zhejiang CFMOTO Power Co., Ltd., Zhejiang (CN)

(72) Inventors: Longping Luo, Hangzhou (CN); Wanru Liu, Hangzhou (CN); Mei Zhong, Hangzhou (CN); Jianyong Wang, Hangzhou (CN); Zhipeng Lin, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

(21) Appl. No.: 18/963,815

(22) Filed: Nov. 29, 2024

(65) Prior Publication Data
US 2025/0091682 A1 Mar. 20, 2025

Related U.S. Application Data

(63) Continuation of application No. PCT/CN2023/097031, filed on May 30, 2023.

(30) Foreign Application Priority Data

May 30, 2022 (CN) ......................... 202210605865.5

(51) Int. Cl.
*B60G 3/20* (2006.01)
*B60G 13/00* (2006.01)
(Continued)

(52) U.S. Cl.
CPC ............... *B62K 5/01* (2013.01); *B60G 3/20* (2013.01); *B60K 17/34* (2013.01); *B60R 25/04* (2013.01);
(Continued)

(58) Field of Classification Search
CPC . B60G 3/20; B60G 7/00; B60G 21/00; B60G 2200/144; B60G 2300/07;
(Continued)

(56) References Cited

U.S. PATENT DOCUMENTS 7,618,063 B2 11/2009 Takeshima et al.
7,819,428 B2 10/2010 Tsuruta et al.
(Continued)

FOREIGN PATENT DOCUMENTS

CN 206327495 U 7/2017
CN 110435795 A 11/2019
(Continued)

*Primary Examiner* — Jason D Shanske
*Assistant Examiner* — Daniel M. Keck
(74) *Attorney, Agent, or Firm* — Shewchuk IP Services, LLC; Jeffrey D. Shewchuk

(57) ABSTRACT

An all-terrain vehicle includes a frame; four wheels; a suspension system; and a prime mover assembly. The frame includes auxiliary main beams which extend upwardly from a mid-height of one of the mid-rear pillars in a front tube section, and then angles from 120 to 170° to a longitudinal portion welded along its length to the upper main beam. The front tube sections each define a triangular shape together with the mid-rear pillars and the upper main beams. The all-terrain vehicle includes a front mounting bracket and two cargo rack structures, a cooling fan cover which supports several components of the cooling system, rear suspension swing arm mount plates formed of sheet metal, a passenger seat that elastically allows backrest lean angle changes, and a dual action brake caliper.

20 Claims, 21 Drawing Sheets

(51) Int. Cl.
  *B60G 21/055*  (2006.01)
  *B60K 17/34*  (2006.01)
  *B60R 25/04*  (2013.01)
  *B60R 25/24*  (2013.01)
  *B60R 25/33*  (2013.01)
  *B60T 1/06*  (2006.01)
  *B60T 7/04*  (2006.01)
  *B60T 7/08*  (2006.01)
  *B60T 13/12*  (2006.01)
  *B62D 17/00*  (2006.01)
  *B62K 5/00*  (2013.01)
  *B62K 5/01*  (2013.01)
  *B62K 5/08*  (2006.01)
  *B62K 19/06*  (2006.01)
  *B62K 19/30*  (2006.01)
  *B62K 25/04*  (2006.01)

(52) U.S. Cl.
  CPC ........... *B60R 25/245* (2013.01); *B60R 25/33* (2013.01); *B60T 1/065* (2013.01); *B60T 7/04* (2013.01); *B60T 7/08* (2013.01); *B60T 13/12* (2013.01); *B62D 17/00* (2013.01); *B62K 19/06* (2013.01); *B62K 19/30* (2013.01); *B60G 2200/144* (2013.01); *B60G 2300/07* (2013.01); *B60G 2300/124* (2013.01)

(58) Field of Classification Search
  CPC . B60G 2300/124; B60R 25/04; B60R 25/245; B60R 25/33; B60K 17/34; B60T 1/065; B60T 7/04; B60T 7/08; B60T 13/12; B62D 17/00; B62K 5/01; B62K 5/08; B62K 19/06; B62K 19/30; B62K 19/34; B62K 19/36; B62K 19/38; B62K 25/04; B62K 2005/001
  USPC ........................................................ 180/311
  See application file for complete search history.

(56) References Cited

U.S. PATENT DOCUMENTS

| | | | |
|---|---|---|---|
| 11,014,419 B2 | 5/2021 | Danielson et al. | |
| 2006/0283650 A1* | 12/2006 | Kawamura | B62K 19/06 |
| | | | 180/219 |
| 2012/0104738 A1* | 5/2012 | Mizuta | B62K 5/01 |
| | | | 280/779 |
| 2014/0183834 A1* | 7/2014 | Okuyama | B60G 3/20 |
| | | | 280/124.109 |

FOREIGN PATENT DOCUMENTS

| | | |
|---|---|---|
| CN | 213199895 U | 5/2021 |
| CN | 215322867 U | 12/2021 |
| CN | 217435920 U | 9/2022 |
| CN | 217435924 U | 9/2022 |
| CN | 217435934 U | 9/2022 |
| CN | 217435939 U | 9/2022 |
| CN | 217496379 U | 9/2022 |
| CN | 217515296 U | 9/2022 |
| CN | 217515298 U | 9/2022 |

\* cited by examiner

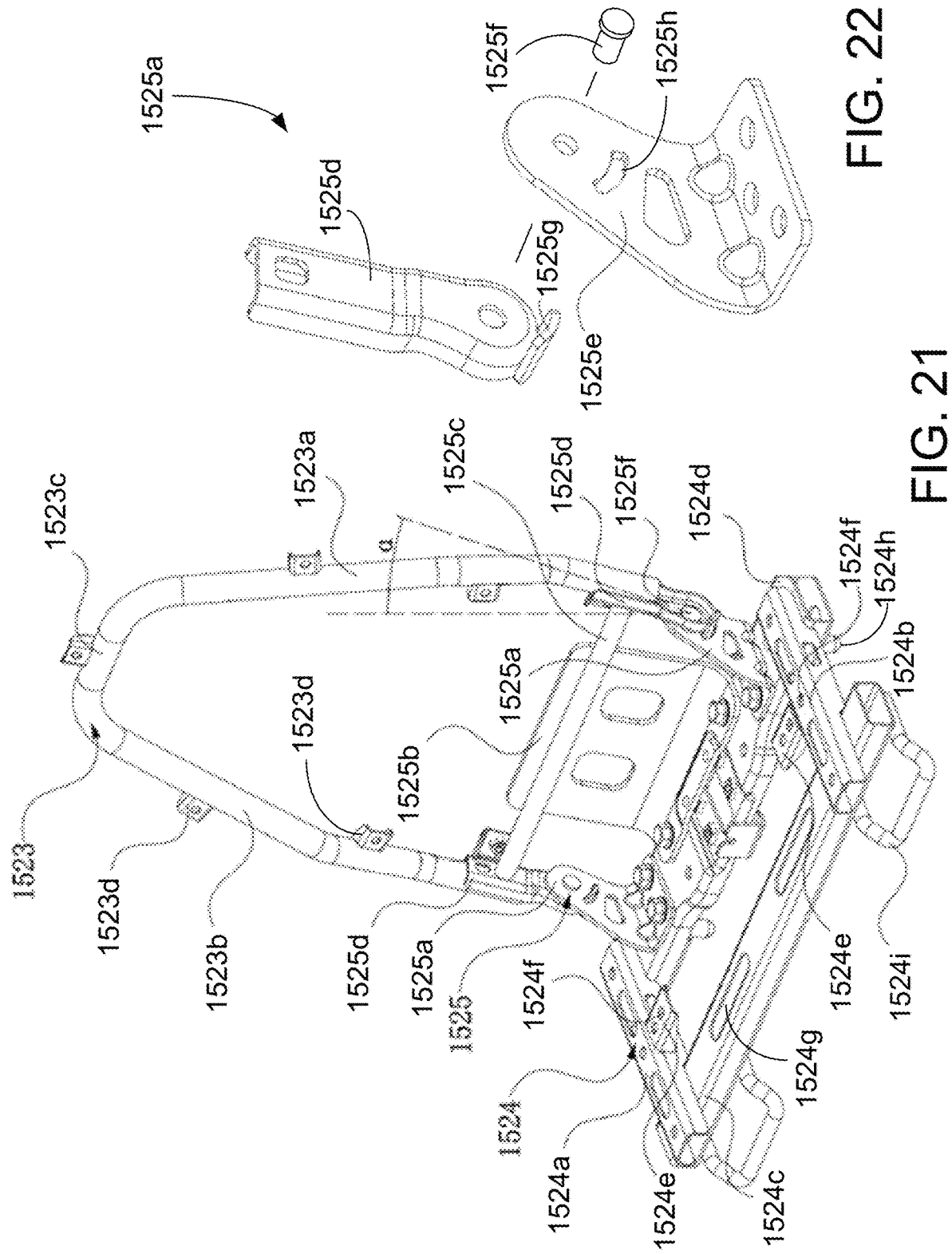

ALL-TERRAIN VEHICLE

RELATED APPLICATION INFORMATION

The present application is a continuation of and claims the benefits of priority to International Application Number PCT/CN2023/097031, entitled ALL-TERRAIN VEHICLE, filed on May 30, 2023, and further claims priority to Chinese Patent Application No. 202210605865.5 with a title of "All-Terrain Vehicle" filed on May 30, 2022, the entire contents of which are incorporated by reference herein.

FIELD OF THE DISCLOSURE

The present disclose generally relates to vehicles, and particularly relates to an all-terrain vehicle.

BACKGROUND OF THE DISCLOSURE

All-terrain vehicles are four-wheeled off-road vehicles that intended for use in all weather and over a wide variety of terrains. The frame of the all-terrain vehicle is key as the main load-bearing component of the vehicle. The reliability, stability and service life of the vehicle, driving safety and ride comfort of the vehicle are all inseparable from the structure and performance of the frame. All-terrain vehicles must adapt to various complex working environments, which not only requires high strength and rigidity of the frame, but also requires the frame to be lightweight.

At present, although there are some lightweight all-terrain vehicles, they generally compromise on body structure or strength. For instance, some all-terrain vehicles adopt some lightweight frame materials. Although they can lower weight, some lightweight frame materials can greatly increase cost, and some lightweight materials cannot meet requirements of safety and stability during operation of the all-terrain vehicle.

As to how to reduce weight of the frame of the all-terrain vehicle while meeting strength and stiffness requirements of the frame, existing technologies have not yet proposed an effective solution. Better solutions are needed.

SUMMARY

Embodiments of the present disclosure provides an all-terrain vehicle that can solve at least part of the existing technological problems.

In a first aspect, an all-terrain vehicle includes a frame, four wheels including a pair of front wheels connected to the frame through a front suspension and a pair of rear wheels connecting to the frame through a rear suspension, and a prime mover assembly supported on the frame. The frame includes right and left upper main beams arranged on an upper side of the frame and running longitudinally, right and left lower main beams arranged below the respective right and left upper main beams, and right and left pillars running between and connecting the respective right and left lower main beams to the respective right and left upper main beams. The frame further includes right and left auxiliary main beams. Each auxiliary main beam extends upwardly from one of the pillars, with at least a portion of each auxiliary main beam running longitudinally and being connected to the respective upper main beam over a length of at least twice a thickness of the auxiliary main beam.

In a second aspect, each of the auxiliary main beams has a tube portion extending at an angle relative to its longitudinal portion. The longitudinal portion of each auxiliary main beam connects to the respective upper main beam over its length, and the tube section extends at an angle in the range from 120 to 170° relative to the longitudinal section.

In a third aspect, the pillars include right and left front pillars, right and left mid-front pillars, right and left mid-rear pillars and right and left rear pillars all running between and connecting the respective right and left lower main beams to the respective right and left upper main beams. The tube portion of each auxiliary main beam extends upwardly from a mid-height of the respective right/left mid-rear pillar, and the longitudinal portion connects to the respective right/left upper main beam over its length.

The present disclosure also introduces other inventive aspects of the preferred all-terrain vehicle, such as involving its collection of mounting brackets, its cooling fan cover, its rear suspension swing arm mount plates, its passenger seat, its fuel tank and its brake caliper.

Comparing with related technologies, the all-terrain vehicle provided in the embodiments of the present invention achieves significant weight reduction by optimizing support positions and structures of the frame, while also meeting strength and stiffness requirements of the frame.

The details of one or more embodiments of the present disclosure are presented in the following figures and description to make other features, objectives, and advantages of the present disclosure more concise and understandable.

BRIEF DESCRIPTION OF THE DRAWINGS

The drawings described herein are intended to provide further understanding of preferred embodiments of the present invention. The illustrative embodiments of the present disclosure and their descriptions are used to explain the present invention and do not constitute improper limitations on the present invention. In the drawings:

FIG. 21 is a front left perspective view of internal components of the passenger's seat of FIG. 20.

FIG. 22 is an enlarged and exploded front left perspective view of the right angle limiting pivot of the passenger's seat of FIG. 20.

DETAILED DESCRIPTION

In order to make objectives, technical solutions and advantages of the present invention more clearly understood, preferred embodiments are described and illustrated below in conjunction with the accompanying drawings and embodiments.

Figure 1:
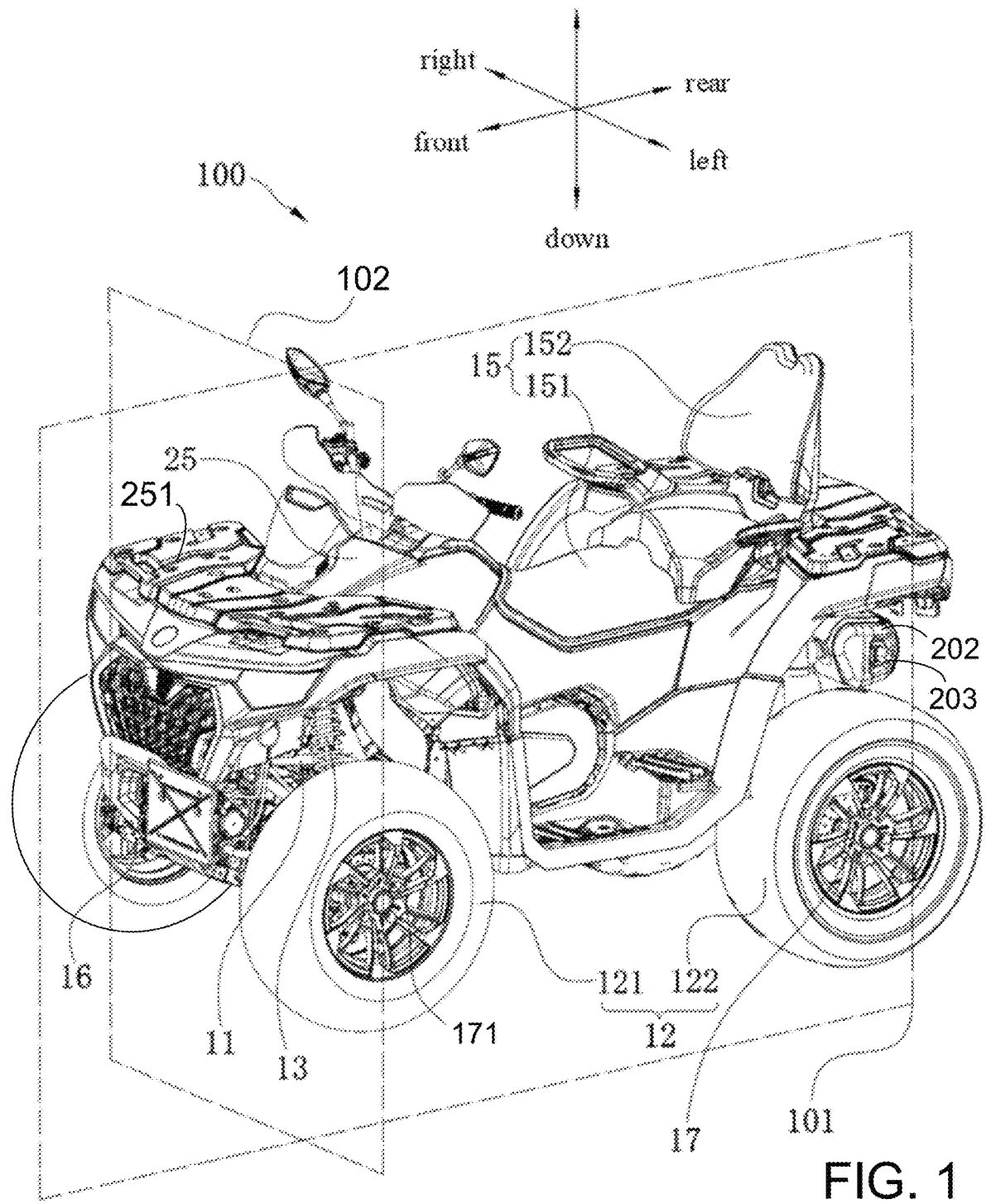
FIG. 1 is a front left perspective view of an all-terrain vehicle according to an embodiment of the present invention.

As shown and called out in FIG. 1, an all-terrain vehicle 100 includes a frame 11, four wheels 12 including a pair of front wheels 121 and a pair of rear wheels 122, a suspension system 13, a straddle-type saddle 15 including a driver's seat 151 and a passenger's seat 152, a collection of mounting brackets 16, a brake system 17, and a body cover 25 including a front cargo platform 251 and a rear cargo platform 252. The general orientations of front, rear, up (upper), down (lower), left and right for the all-terrain vehicle 100 are defined in FIG. 1. The terms "up", "down" "vertical", "horizontal", etc. used herein assume the vehicle wheels are on a flat, a horizontal surface, i.e., not on a slope, and with the wheel/tire sizes depicted. A front axis plane 102 is defined as a vertical plane perpendicular to the front-rear direction and containing the rotational axes of the unturned front wheels 121. Front view projections as discussed herein can be viewed as projections on the front axis plane 102. As shown and called out in FIG. 2, the all-terrain vehicle 100 further includes a prime mover assembly 14, an electrical system 18, an air intake system 19, exhaust system 20, a fuel system 21 and a cooling system 22.

The four wheels 12 are used for movement of the all-terrain vehicle 100. The suspension system 13 is used to connect the frame 11 and the four wheels 12, including a front suspension 131 for the front wheels 121 and a rear suspension 132 for the rear wheels 122. The prime mover assembly 14 is supported by the frame 11, and the prime mover assembly 14 is coupled to the four wheels 12 and provides torque for the four wheels 12, thereby providing locomotion for driving the all-terrain vehicle 100. The saddle 15 is at least partially disposed on a top side of the frame 11 for riding by one or more users and/or passengers. The collection of mounting brackets 16 is at least partially arranged on the frame 11 and is configured to mount other components adapted to the all-terrain vehicle 100. The brake system 17 is at least partially arranged on the frame 11 and at least partially arranged on the four wheels 12, and is configured to brake the four wheels 12, thereby braking the all-terrain vehicle 100. The electrical system 18 is at least partially arranged on the frame 11 such as through the collection of mounting brackets 16 for providing electrical power. Air is provided to the prime mover assembly 14 through the air intake system 19, used for combustion, with the exhaust fumes being removed from the prime mover assembly 14 through the exhaust system 20. The fuel system 21 is at least partially arranged on the frame 11 and is configured to provide fuel to the prime mover assembly 14. The cooling system 22 is at least partially arranged on the frame 11 for dissipating heat out of the all-terrain vehicle 100. The body cover 25 is at least partially arranged on the frame 11 such as by the collection of mounting brackets 16.

Figure 3:
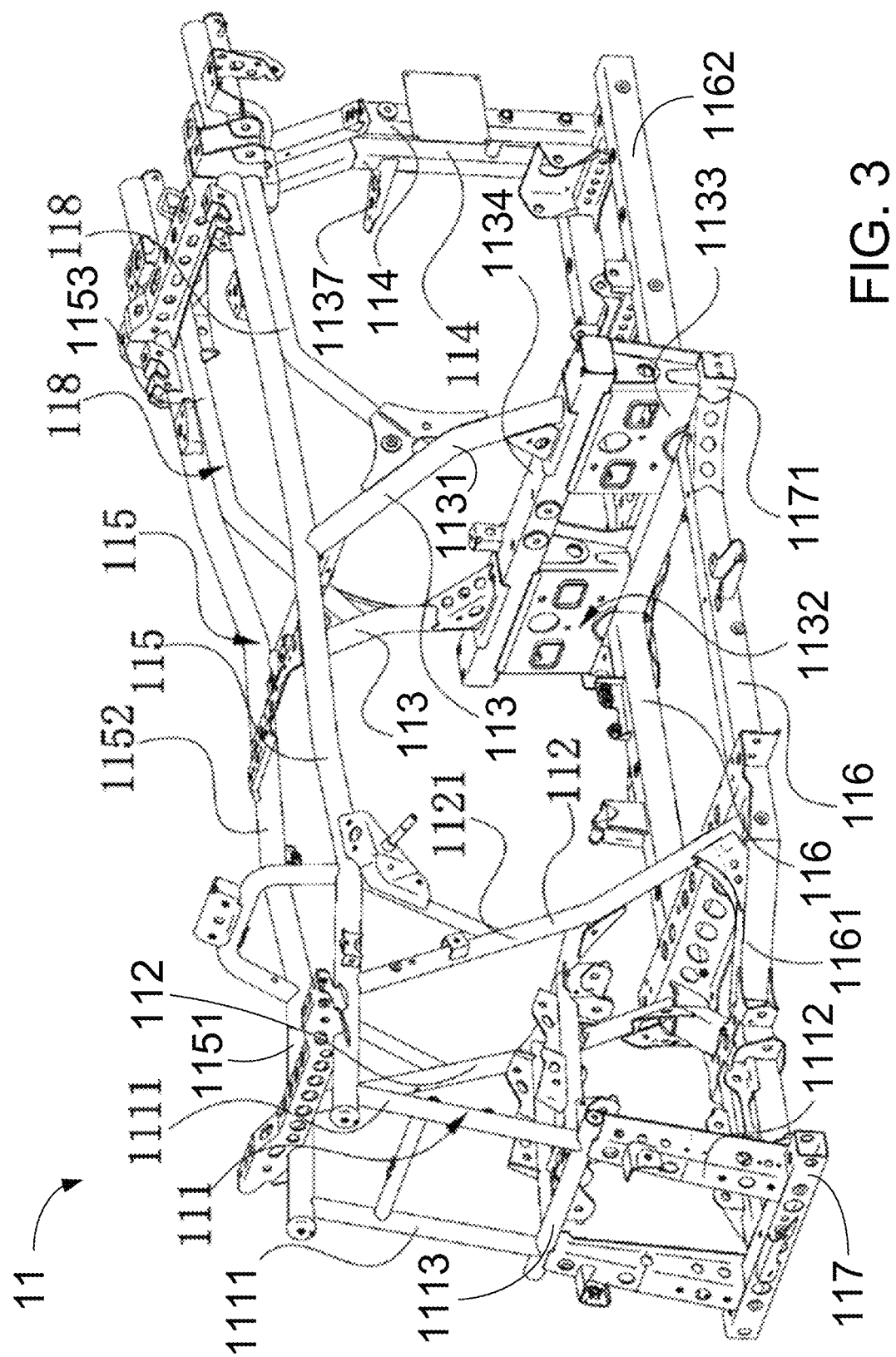
FIG. 3 is a front left perspective view of the frame of FIG. 2.

As shown in FIG. 3, the preferred frame 11 is a weldment which is roughly bilaterally symmetrical, and includes a front pillar 111, a mid-front pillar 112, a mid-rear pillar 113, a rear pillar 114 on each of the left and right sides, all running primarily vertically. The preferred frame 11 further includes right and left upper main beams 115, and right and left lower main beams 116 all running longitudinally. The front pillars 111, the mid-front pillars 112, the mid-rear pillars 113, and the rear pillars 114 all extend arranged between the respective right or left upper main beam 115 and lower main beam 116. The frame further includes a plurality of cross tubes 117 running laterally between the right and left main beams 115, 116. The front suspension 131 is arranged substantially in the space 1311 (see FIG. 15) between the front pillars 111 and the mid-front pillars 112, the prime mover assembly 14 is arranged substantially in the space between the mid-front pillar 112 and the mid-rear pillar 113, and the rear suspension 132 is arranged substantially in the space between the mid-rear pillar 113 and the rear pillar 114. The frame 11 may be made of a high-strength material such as 20 CrMo steel, thereby increasing the strength of the frame 11 and reducing the weight of the frame 11.

At least one set of the pillars 111, 112, 113, 114 (in the preferred embodiment each front pillar 111) is at least partially formed of sheet metal, such as having the front pillars 111 each with an upper tube 1111 and a lower sheet metal 1112, and having the mid-rear pillars 113 with an upper tube 1131 and a lower sheet metal 1132. The structure of the pillar 111 is thus optimized by replacing tube members with sheet metal members, thereby reducing the number of tube members of the frame 11 and reducing the weight of the all-terrain vehicle 100. The lower sheet metals 1112, 1132 can facilitate installation of components and parts onto the all-terrain vehicle 100, which is beneficial to improving assembly performance of the all-terrain vehicle 100. Through this arrangement, the complexity of the collection of mounting brackets 16 can be reduced.

In the preferred embodiment, the height of the front pillars 111 is split relatively equally between the upper tubes 1111 and the lower sheet metals 1112, with the upper tubes 1111 being slightly longer. More specifically, a front pillar height ratio of the height of the upper tubes 1111 divided by the height of the lower sheet metals 1112 is preferably greater than or equal to 0.86 and less than or equal to 1.61, more preferably greater than or equal to 0.98 and less than or equal to 1.48, and most preferably greater than or equal to 1.11 and less than or equal to 1.36. Front pillar height ratios within these ranges help reduce weight of the front pillar 111 while still providing sufficient strength. A front pillar cross-tube 1113 preferably is joined laterally between the right and left front pillars 111 at the junction between the upper tubes 1111 and the lower sheet metals 1112.

Figure 4:
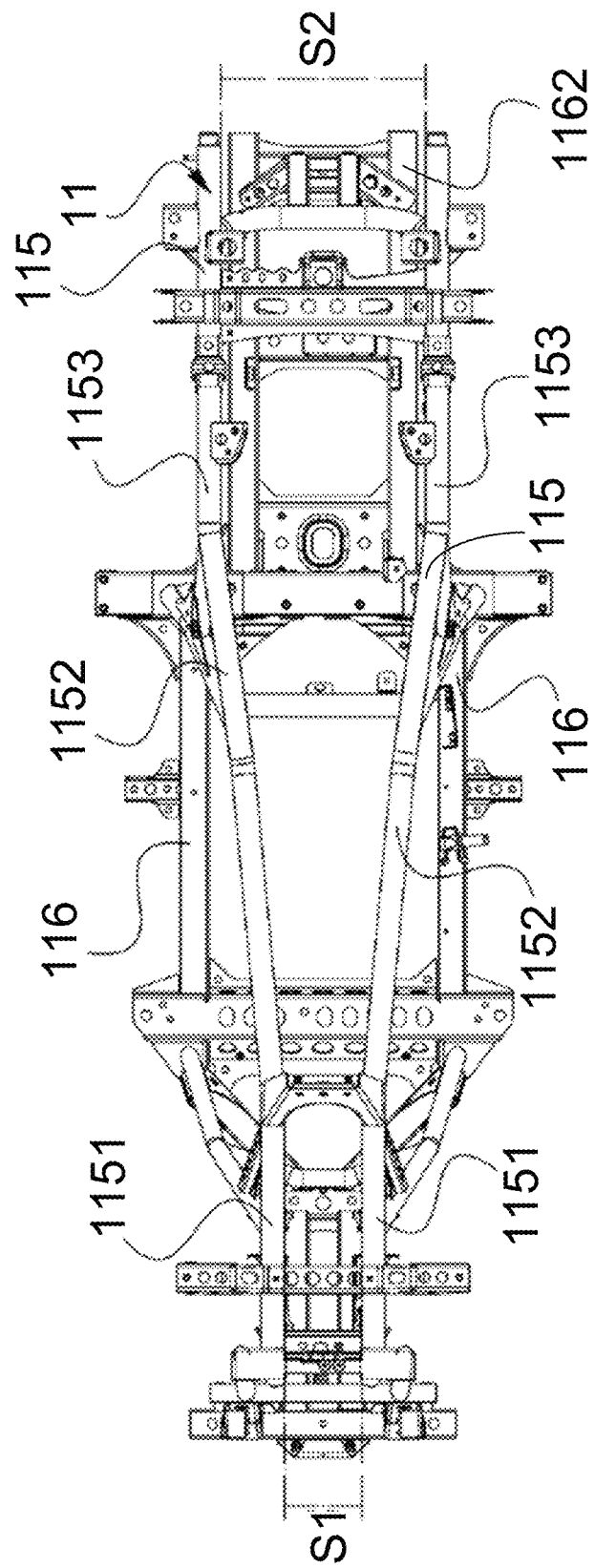
FIG. 4 is a top plan view of the frame of FIGS. 2 and 3.
Figure 5:
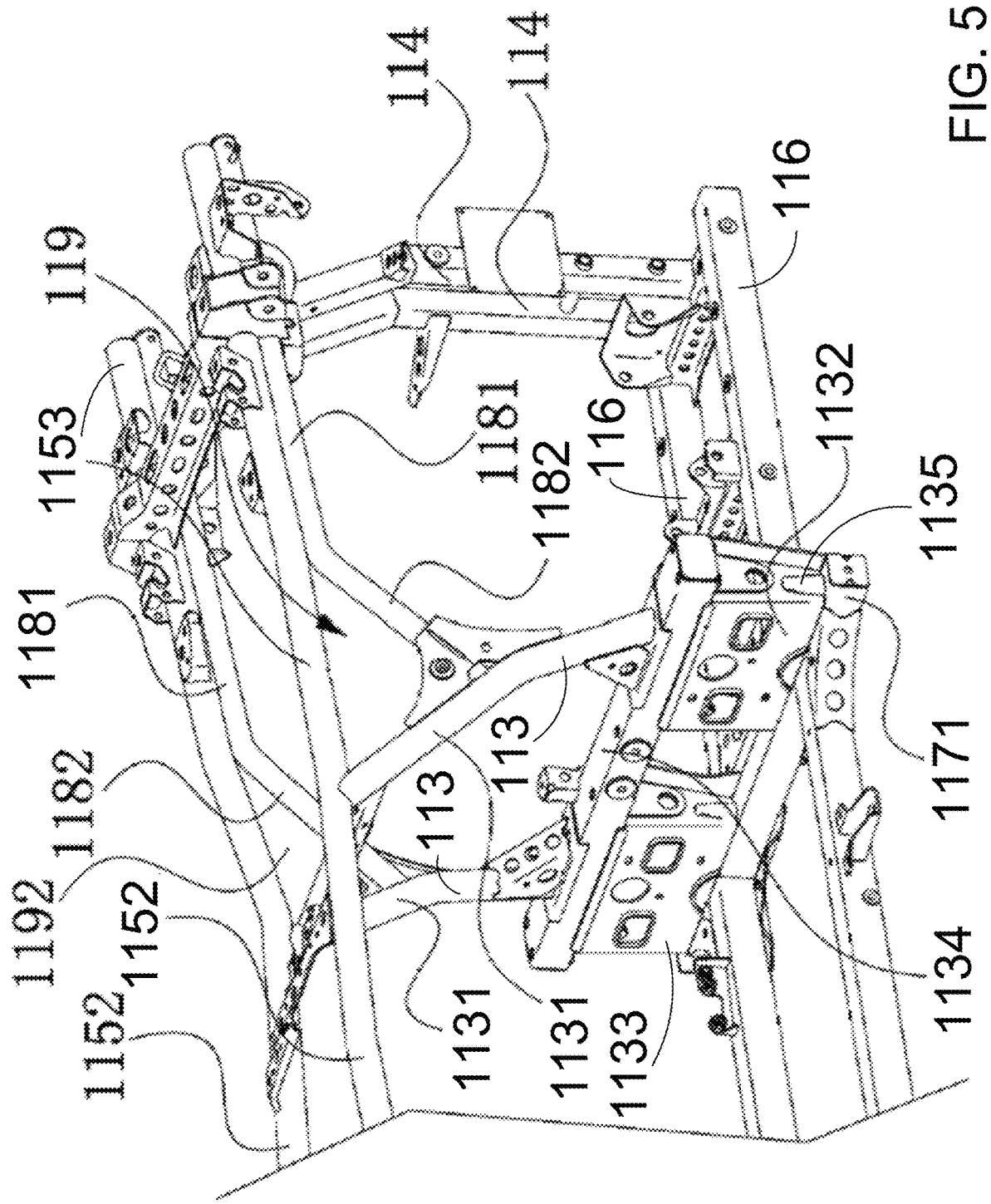
FIG. 5 is a front left perspective view of a rear portion of the frame of FIGS. 2-4.

As best shown in FIG. 4, each of the right and left upper main beams 115 include a front portion 1151 between the respective front pillar 111 and mid-front pillar 112, a central portion 1152 between the respective mid-front pillar 112 and mid-rear pillar 113, and a rear portion 1153 between the respective mid-rear pillar 113 and rear pillar 114. The central portion 1152 angles outwardly and rearwardly. Due to this outward and rearward angling, the upper main beams 115 define a front upper beam spacing S1 between the axes of the front portions 1151 and a rear upper beam spacing S2 between the axes of the rear portions 1153. The front upper beam spacing S1 is less than the rear upper beam spacing S2. Having a smaller front upper beam spacing S1 is beneficial to cabling on the all-terrain vehicle 100, while having a larger rear upper beam spacing S2 is beneficial to arrangement of the prime mover assembly 14 and saddle 15. Specifically, the upper beam spacing ratio S1/S2 of the front upper beam spacing distance S1 to the rear upper beam spacing S2 is greater than or equal to 0.3 and less than 1, preferably greater than or equal to 0.4 and less than or equal to 0.9, and more preferably greater than or equal to 0.5 and less than or equal to 0.8, thereby improving space utilization of the all-terrain vehicle 100.

As shown in FIG. 3, as an embodiment, the frame 11 further includes right and left auxiliary main beams 118. Each auxiliary main beam 118 runs along its associated right or left upper main beam 115 for a distance of at least twice the thickness of the auxiliary main beam 118. For instance, each of the preferred auxiliary main beams 118 are arranged from a connection to the upper tube 1131 of the respective (right or left) mid-rear pillar 113 to a longitudinal section 1181 running below the respective upper main beam 115 between the mid-rear pillar 113 and the rear pillar 114. The support to the upper main beam 115 is changed from merely point support locations to include a lengthwise united surface support location. That is, at least part of the auxiliary main beam 118 and the upper main beam 115 are in line contact or surface contact extending for at least twice the thickness of the auxiliary main beam 118. The weld connection between the longitudinal section 1181 of the auxiliary main beam 118 and its associated upper main beam 115 is preferably a longitudinally running lap weld which improves stress condition between the upper main beam 115 and the mid-rear pillar 113. The longitudinally running lap weld connection between the longitudinal section 1181 of the auxiliary main beam 118 and its associated upper main beam 115 improves the strength and rigidity of the upper main beam 115 and helps preventing the upper main beam 115 from cracking due to insufficient strength.

Each auxiliary main beam 118 includes a front tube section 1182 integrally formed with and angled relative to the longitudinal section 1181. The front tube section 1182 preferably extends at an angle in the range from 120 to 170° relative to the longitudinal section 1181. The front tube section 1182 of each auxiliary main beam 118 has its front end welded to a mid-height on the associated right or left mid-rear pillar. With its associated auxiliary main beam 118, each mid-rear pillar 113 thus supports its associated right or left upper main beam 115 at a forward point support as well as a rear line/surface support. With the added support from its associated right or left auxiliary main beam 118, each upper main beam 115 can withstand greater bending moments along the longitudinally running lap weld connection.

In the preferred embodiment, the front tube section 1182 of the auxiliary main beam 118 defines a nearly equilateral triangle 119 with its mid-rear pillar 113 and its upper main beam 115. The triangle 119 improves connection stability of the associated mid-rear pillar 113, upper main beam 115, and auxiliary main beam 118. The front tube section 1182 may alternatively form other shapes relative to its mid-rear pillar 113 and its upper main beam 115.

Figure 6:
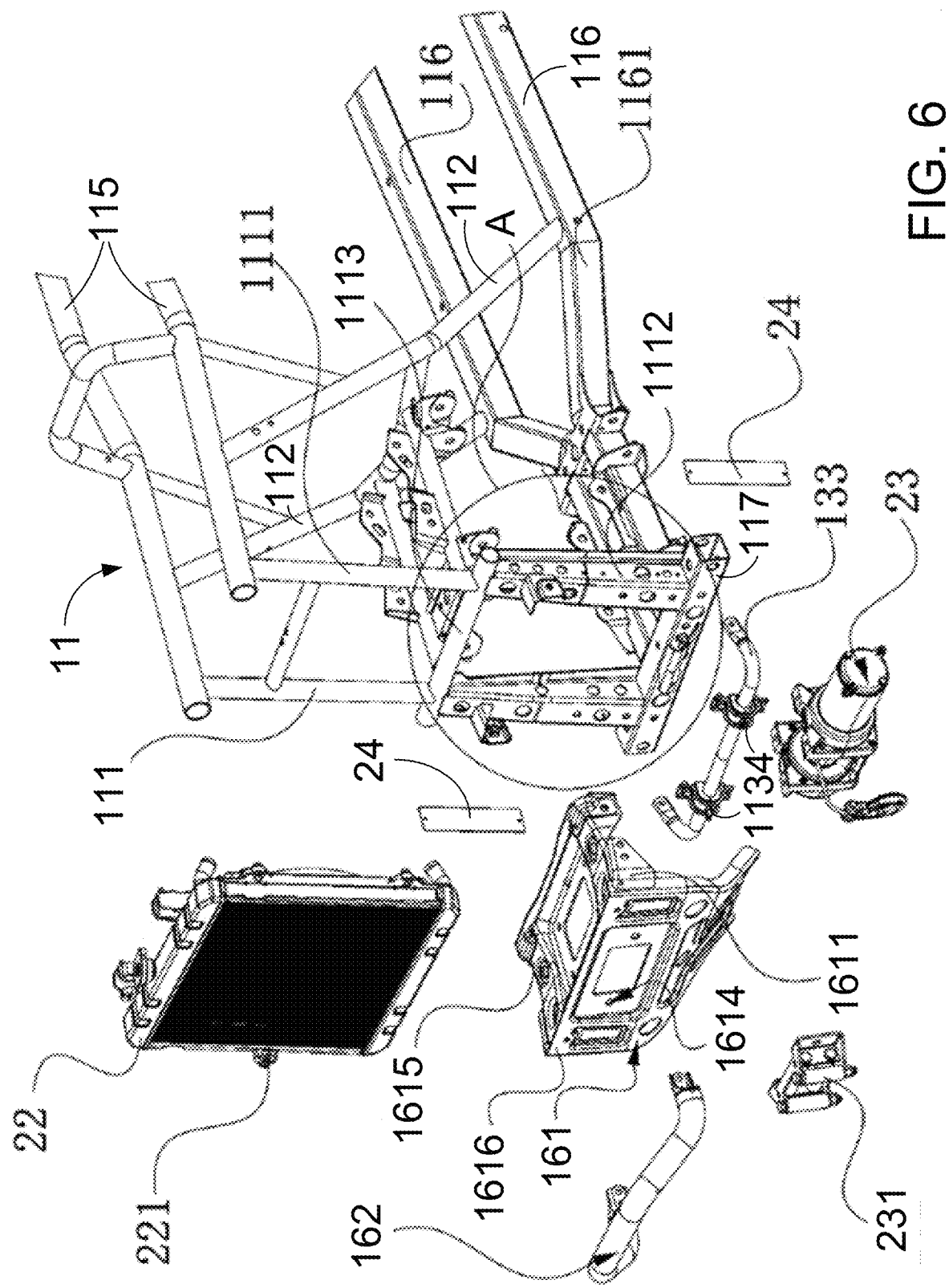
FIG. 6 is a front left perspective view of a front portion of the frame of FIGS. 2-4, also showing a front bumper, front bracket, radiator assembly, winch and front torsion bar of the all-terrain vehicle of the FIG. 1.
Figure 7:
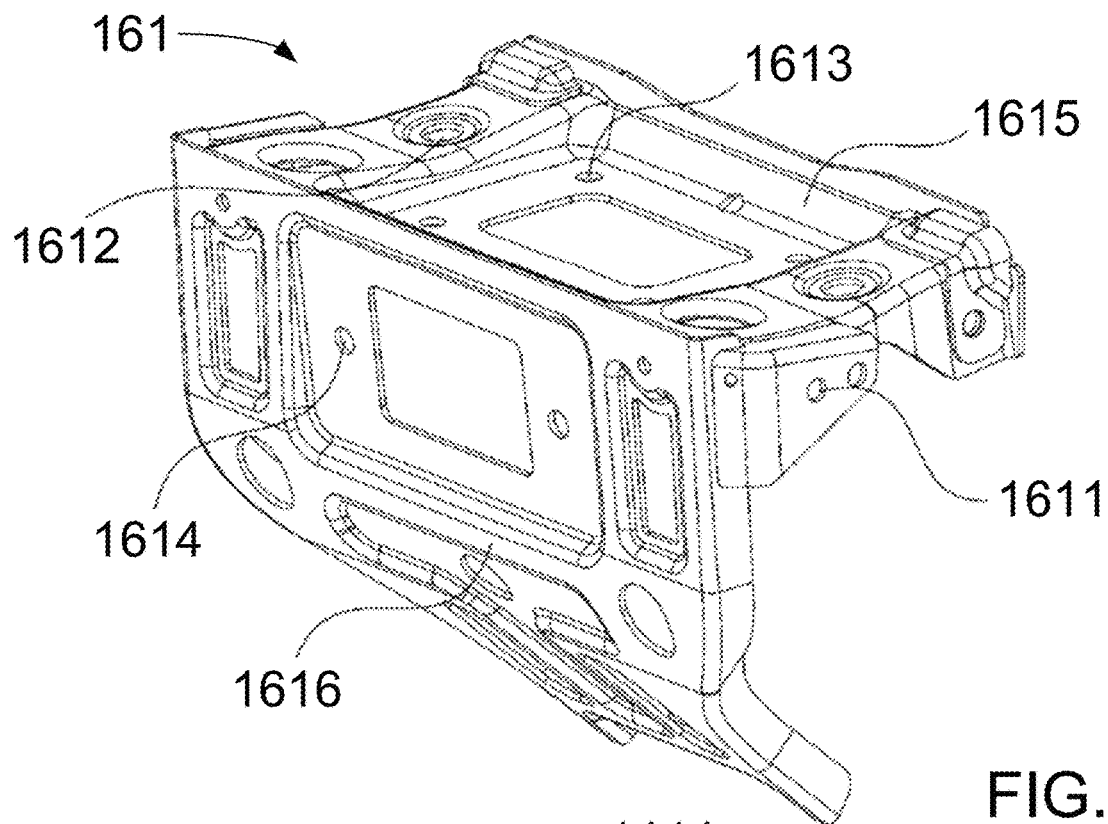
FIG. 7 is an enlarged view of the front bracket of FIG. 6.

The collection of mounting brackets 16 preferably includes a front bracket 161 best shown in FIGS. 6 and 7. The front bracket 161 is mounted on the frame 11, such as from the front lower sheet metal 1112. The cooling system 22 is at least partially arranged on the front bracket 161, with the front bracket 161 preferably supporting a radiator assembly 221 of the cooling system 22. The all-terrain vehicle 100 further includes a winch 23, which is also mounted on the front bracket 161. The front bracket 161 can be easily mounted and dismounted such as by having a bolted connection to the front lower sheet metal 1112, which is useful both for servicing the radiator assembly 221 and the winch 23, as well as for replacement of the front bracket 161 should it become damaged at the front of the vehicle 100.

The all-terrain vehicle 100 preferably includes a front bumper 162 to help protect components on the front of the vehicle 100. The front bumper 162 can be mounted from the front pillar 111, but more preferably is mounted to the front bracket 161. Mounting positions such as bolt or rivet holes for mounting the front bumper 162, the radiator assembly 221 and the winch 23 are integrated on the front bracket 161, thereby making the structure of the all-terrain vehicle 100 more compact, reducing the weight and cost of the all-terrain vehicle 100, and improving assembly performance of the all-terrain vehicle 100. Specifically, the front bracket 161 includes front bumper mounting holes 1611, radiator mounting holes 1612, and winch mounting holes 1613, all called out in FIG. 7. The front bracket 161 can also include guide mounting holes 1614 for mounting a rope-guiding bracket 231 for the winch 23.

Figure 8:
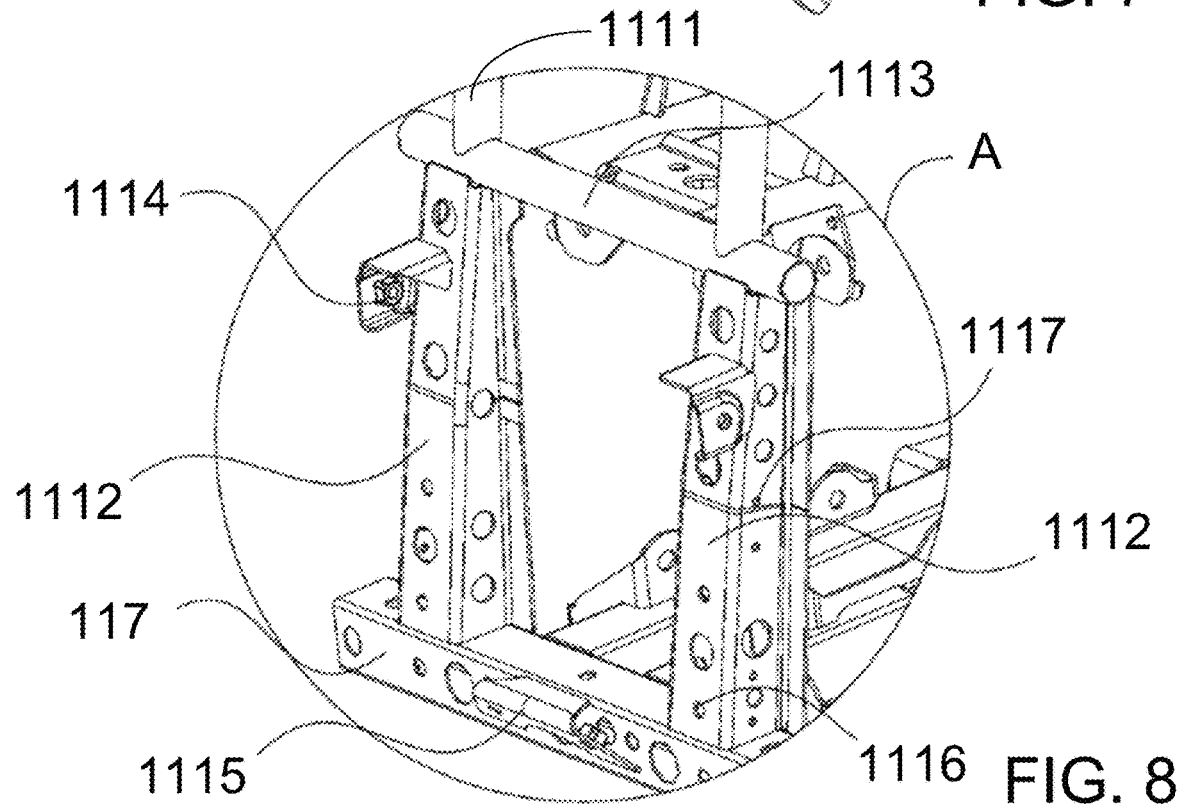
FIG. 8 is an enlarged view of the encircled region A in FIG. 6.

FIGS. 7 and 8 better show the preferred front bracket 161 and the preferred front lower sheet metal 1112 of the front pillar 111. The front bracket 161 preferably includes an upper arm 1615 which extends generally horizontally and a lower arm 1616 extending downwardly and rearwardly from a front of the upper arm 1615. The upper arm 1615 of the front bracket 161 is preferably bolted to upper arm connection flanges 1114 toward the top of the front lower sheet metals 1112. The lower arm 1616 can hook around a lower arm connection pin 1115 extending as a cross-brace between the lower main beams 116. The preferred connection method of the front bracket 161 involves hooking the lower arm 1616 around the lower arm connection pin 1115 to support its weight, pivoting the front bracket 161 rearwardly until the upper arm 1615 contacts the front lower sheet metals 1112, and then bolting the upper arm 1615 to the upper arm connection flanges 1114, making for a stable, reliable yet still quick and maintenance-friendly connection.

The layout of the mounting holes 1611, 1612, 1613, 1614 is selected according to the desired layout of components mounted to the front bracket 161. Specifically, the front bumper 162 extends forwardly from the front bracket 161, at least partially in front of the lower arm 1616. The winch 23 is preferably arranged at least partially on the rear side of the lower arm 1616 and at least partially below the upper arm 1615. The radiator assembly 221 is arranged above the upper side of the upper arm 1615. The rope-guiding bracket 231 is preferably arranged between the lower arm 1616 and the front bumper 162.

The front bracket 161 is preferably relatively small relative to the all-terrain vehicle 100 as a whole. For instance, in front view the preferred front bracket 161 occupies from 9 to 18% of the frontal area of the vehicle 100, more preferably from 10 to 17% of the frontal area of the vehicle 100, even more preferably from 12 to 15% of the frontal area of the vehicle 100, and most preferably from 13 to 14% of the frontal area of the vehicle 100 (all without including the frontal area of the four wheels 12). The front view width of the preferred front bracket 161 is from 16 to 31% of the overall vehicle width, more preferably from 18 to 29% of the overall vehicle width, and most preferably from 21 to 26% of the overall vehicle width. The height of the preferred front bracket 161 is from 24 to 47% of the overall vehicle height, more preferably from 28 to 43% of the overall vehicle height, and most preferably from 31 to 39% of the overall vehicle height. Layout space for the front bracket 161 integrating multiple mounting points is smaller than prior art mounting arrangements, which is beneficial to improving the structural compactness of the front bracket 161, thereby improving space utilization of the all-terrain vehicle 100, and reducing the weight and cost of the all-terrain vehicle 100.

The front suspension 131 preferably includes a front torsion bar 133, also referred to as a sway bar or a stabilizer bar, preventing the all-terrain vehicle 100 from tilting too much when only one of the front wheels 121 hits an obstacle and improving the stability of the all-terrain vehicle 100. The front torsion bar 133 is preferably mounted on the front sheet metals 1112 such as using two front torsion bar supports 1331 bolted in to torsion bar mounting holes 1116 on the front lower sheet metals 1112.

The all-terrain vehicle 100 preferably includes two manufacturer's information plates 24 for recording information of the all-terrain vehicle 100 such as the manufacturer's name and rated technical data of the all-terrain vehicle 100. While the manufacturer's information plates 24 can be mounted elsewhere on the frame 11, the manufacturer's information plates 24 are more preferably are mounted on the front sheet metals 1112 using nameplate mounting holes 1117.

Figure 9:
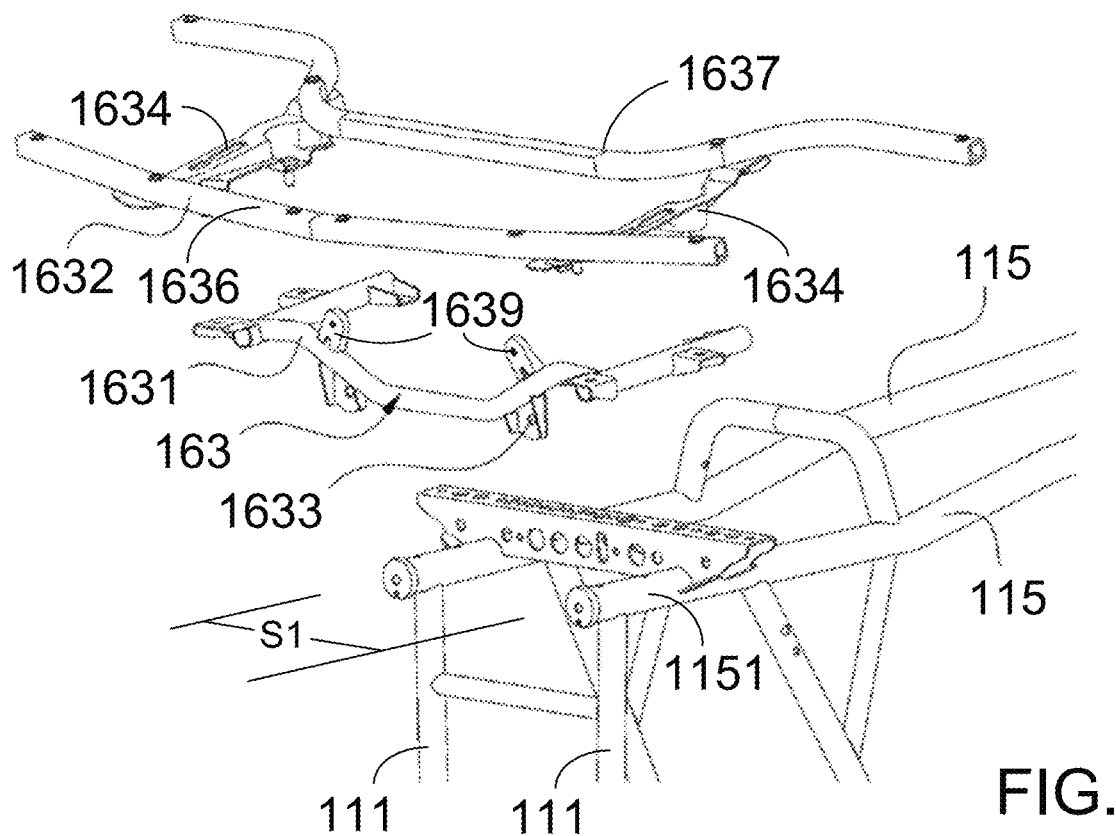
FIG. 9 is a front left partially-exploded perspective view of the front cargo rack and a portion of the frame of the all-terrain vehicle of FIG. 1.
Figure 10:
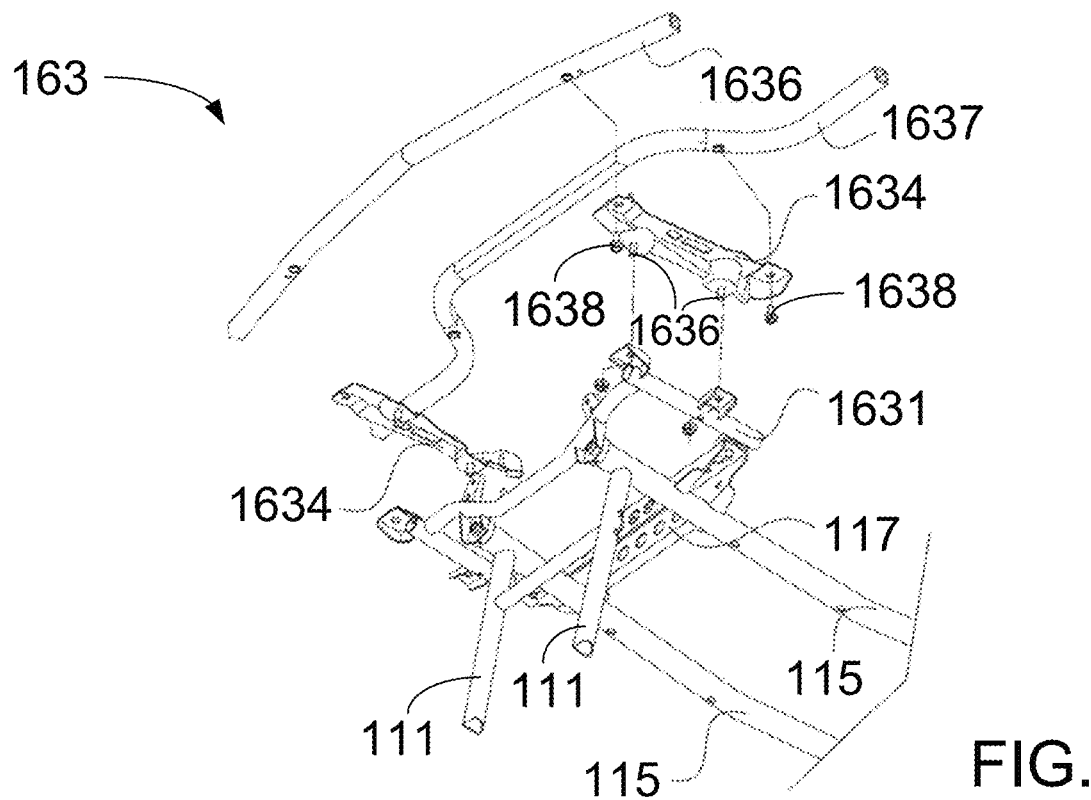
FIG. 10 is a bottom front left perspective view of the cargo rack, with different portions exploded, and part of the frame portion of FIG. 9.

The preferred collection of mounting brackets 16 further includes a front cargo rack 163 shown in FIGS. 9 and 10. The front cargo rack 163 includes a front rack connecting frame 1631 and a front platform skeleton 1632 supported by the front rack connecting frame 1631. The front platform skeleton 1632 preferably supports a front cargo platform 251 shown in FIG. 1. The front rack connecting frame 1631 is detachably mounted to the front of the frame 11 using front rack connection flanges 1633. The front rack connection flanges 1633 are preferably spaced for connection to front end surfaces of the upper main beams 115, providing a stable but quickly detachable mounting connection for the front cargo rack 163. The front cargo rack 163 can be installed or disassembled as a whole, thereby improving maintenance convenience. The front rack connecting frame 1631 extends significantly wider than the front upper beam spacing distance S1, allowing for a wide and well supported front cargo rack 163 despite having a small front upper beam spacing distance S1.

The preferred front platform skeleton 1632 is shown in exploded view in FIG. 10. The front platform skeleton 1632 includes two (right and left) skeleton mounting brackets 1634 which are detachably mounted to the front rack connecting frame 1631 such as by bolts 1635. Forward and rearward cross-rack bars 1636, 1637 are detachably mounted to the two skeleton mounting brackets 1634 such as by bolts 1638, with the cross-rack bars 1636, 1637 extending laterally over a longer distance than the width between the two skeleton mounting brackets 1634. The skeleton mounting brackets 1634 and inner portions of the cross-rack bars 1636, 1637 substantially form a rectangular frame which is symmetrical about the longitudinal midplane 101. The design of the front platform skeleton 1632 provides additional levels of detachment, allowing either integrated installation or removal or piecemeal installation and removal, thereby improving maintainability and options for different cargo mounting arrangements. The cross-rack bars 1636, 1637 are both preferably made of aluminum, thereby reducing weight of the front cargo rack 163.

Figure 11:
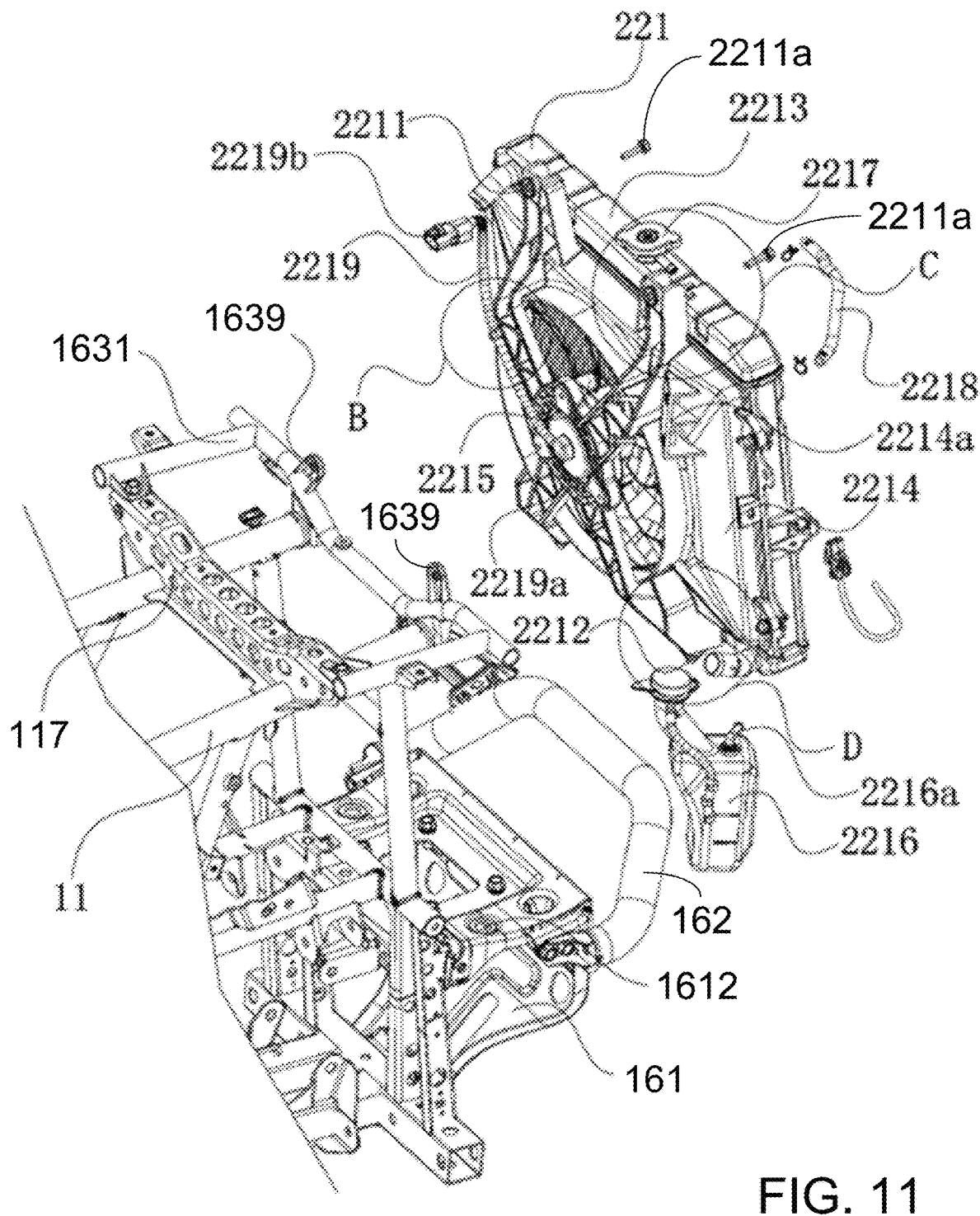
FIG. 11 is a rear right exploded perspective view of a front portion of the frame and cooling system of the all-terrain vehicle of FIG. 1.
Figure 12:
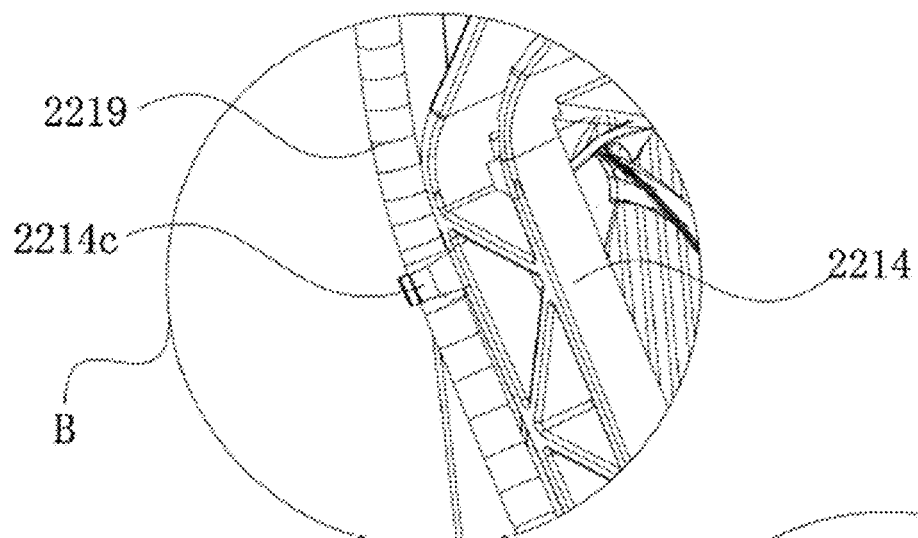
FIG. 12 is an enlarged view of the encircled region B in FIG. 11.
Figure 13:
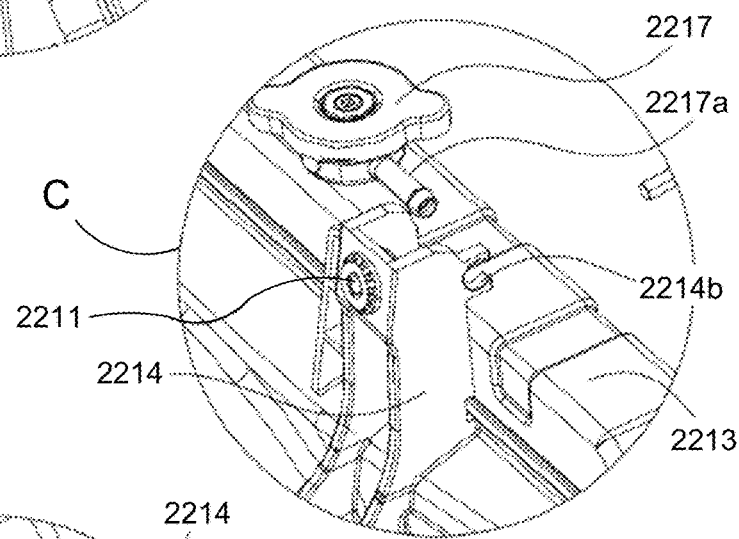
FIG. 13 is an enlarged view of the encircled region C in FIG. 11.
Figure 14:
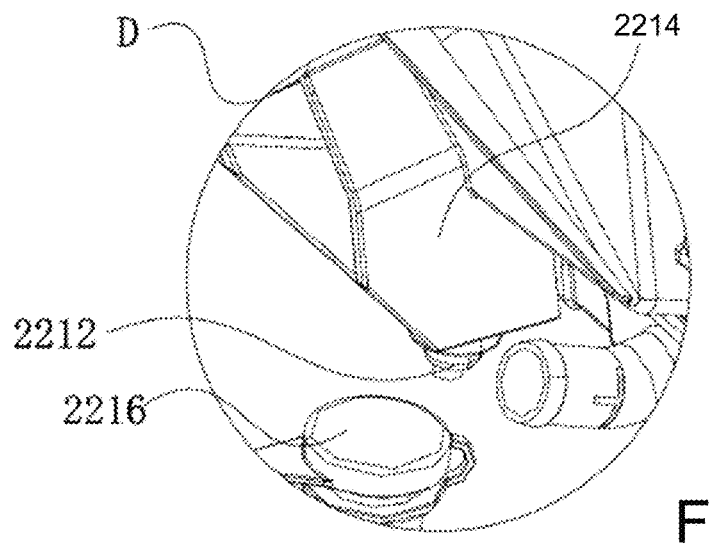
FIG. 14 is an enlarged view of the encircled region D in FIG. 11.

The front rack connecting frame 1631 also includes two radiator mount flanges 1639 called out in FIGS. 9 and 11. FIGS. 11-14 further show the preferred radiator assembly 221 and related parts of the cooling system 22. In addition to using the two radiator mounting holes 1612 of the front bracket 161, the radiator assembly 221 is mounted on the frame 11 using the two radiator mount flanges 1639. For instance, the radiator assembly 221 preferably includes two upper mount points 2211 that, when the radiator assembly 221 is positioned on the front bracket 161, line up with holes in the radiator mount flanges 1639 to allow connection using longitudinally oriented bolts 2211a. The radiator assembly 221 includes two lower mount points 2212 that line up with the radiator mounting holes 1612 of the upper arm 1615 of the front bracket 161, achieving a stable connection and easy installation of the radiator assembly 221.

The preferred radiator assembly 221 includes a radiator 2213, a fan cover 2214, a cooling fan 2215, a coolant overflow tank 2216, a radiator cap 2217, a coolant overflow hose 2218 and a fan cable harness 2219. The cooling fan 2215 and fan cover 2214 are preferably mounted to the radiator 2213 so as to draw ambient air through the radiator 2213, such as being arranged behind the radiator 2213. The fan cable harness 2219 electrically connects the cooling fan 2215 into the electrical system 18. The coolant overflow tank 2216 is at least partially arranged on the fan cover 2214 such as by bolting the coolant overflow tank 2216 to a tank connection flange 2214a of the fan cover 2214. The radiator cap 2217 is attached to an inlet on the top of the radiator 2213. The coolant overflow hose 2218 connects a tank port 2216a on the coolant overflow tank 2216 and to a radiator port 2217a on the radiator 2213 just below the radiator cap 2217 so as to be opened and/or closed by the radiator cap 2217 as known in the art. The tank connection flange 2214a is preferably close to the radiator cap 2217 so as to shorten the length of the coolant overflow hose 2218.

In the preferred embodiment, the mount points 2211, 2212 of the radiator assembly 221 and the tank connection flange 2214a are integral parts of the fan cover 2214. Mounting of the radiator assembly 221 through the fan cover 2214 helps to reduce deformation of the radiator 2213 due to thermal stress, thereby improving strength of the radiator assembly 221. In addition, because the radiator 2213 is largely formed of metal while the fan cover 2214 can be molded polymer, including the mount points 2211, 2212 and the tank connection flange 2214*a* on the fan cover 2214 allows simpler manufacture.

The fan cover 2214 is further provided with a hose clamp 2214*b* and a harness clamp 2214*c*. The clamps 2214*b*, 2214*c* are preferably resilient "C" shaped slotted structures sized to detachably receive middle sections of the coolant overflow hose 2218 and fan cable harness 2219, so as to minimize wear caused by shaking during driving of the all-terrain vehicle 100. The hose claim 2214*b* and the harness clamp 2214*c* accordingly improve the safety and the service life of the all-terrain vehicle 100. Integrating the hose clamp 2214*b* and the harness clamp 2214*c* into the fan cover 2214 allows for easy manufacture and saves layout space.

The addition of the mount points 2211, 2212, the tank connection flange 2214*a*, the hose clamp 2214*b* and the harness clamp 2214*c* into the fan cover 2214 results in a minimally larger profile of the fan cover 2214. In front view, the addition of the mount points 2211, 2212, the tank connection flange 2214*a*, the hose clamp 2214*b* and the harness clamp 2214*c* enlarges the transverse plane projection area of the fan cover 2214 by no more than 58%, preferably by a profile enlargement in the range of 1-39%, more preferably by a profile enlargement in the range of 2-24%, and most preferably by a profile enlargement of about 11%. Having a small profile enlargement caused by the addition of the mount points 2211, 2212, the tank connection flange 2214*a*, the hose clamp 2214*b* and the harness clamp 2214*c* into the fan cover 2214 keeps the fan cover 2214 compact and reduces layout space required for the cooling system 22.

Figure 15:
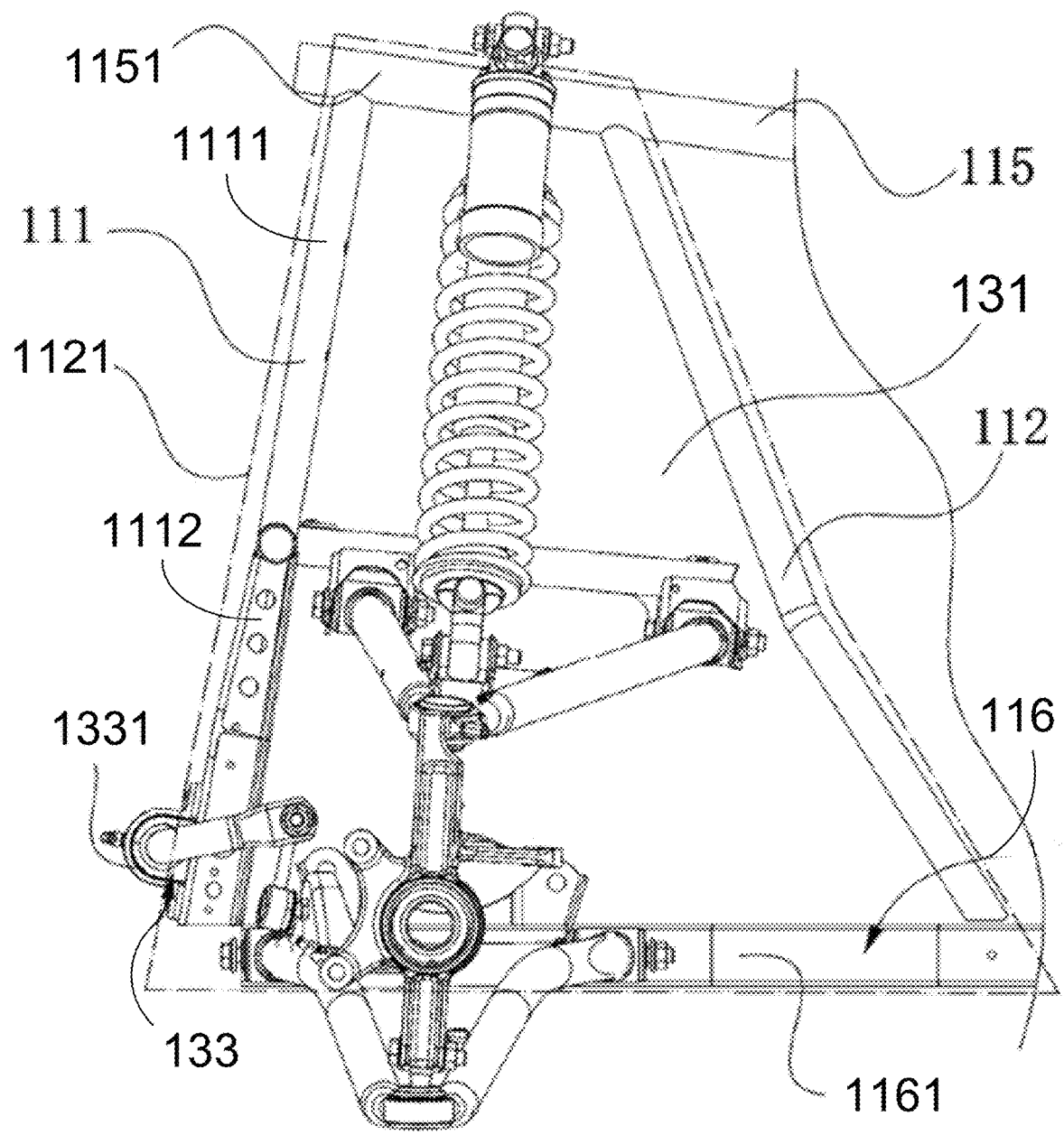
FIG. 15 is a left side view of a front portion of the frame and front suspension of the all-terrain vehicle of FIG. 1.

FIG. 15 shows a side view of the preferred front suspension 131, showing its layout relative to the frame 11. The preferred front suspension 131 is a double rocker A-arm suspension, also known as a double wishbone suspension. The various components of the front suspension 131 are all mounted from a front frame portion 1121 which includes frame components from the mid-front pillars 112 forward, i.e., the front frame portion 1121 includes the front pillars 111, the mid-front pillars 112, the front portions 1151 of the upper main beams 115 forward of the mid-front pillars 112, and front portions 1161 of the lower main beams 116 forward of the mid-front pillars 112.

Figure 16:
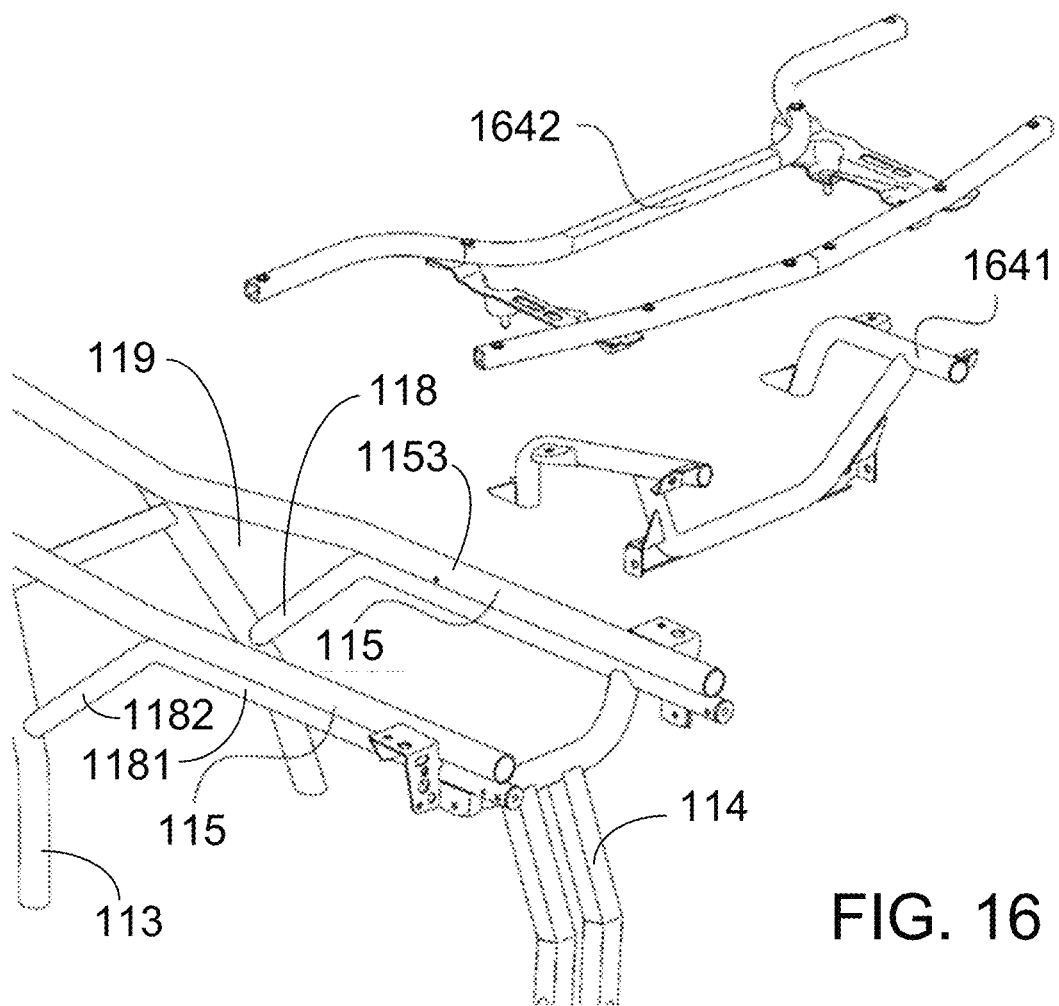
FIG. 16 is a rear left exploded perspective view of the rear cargo rack and a rear frame portion of the all-terrain vehicle of FIG. 1.
Figure 17:
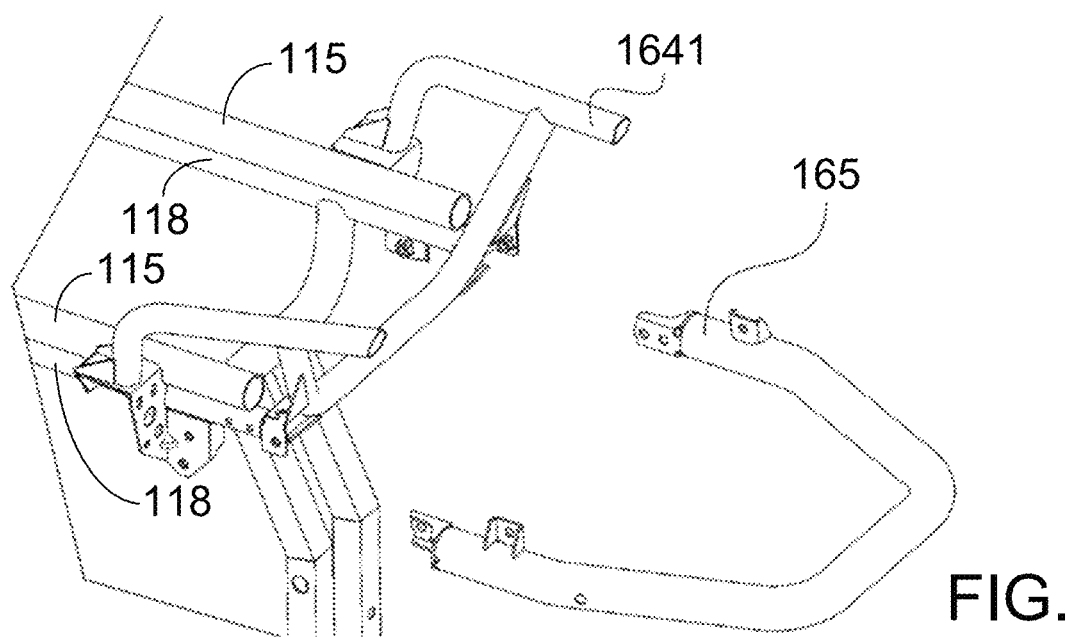
FIG. 17 is a rear left perspective view of the rear rack connecting frame of FIG. 16 attached on the rear frame portion, and also showing the rear bumper of the all-terrain vehicle of FIG. 1.

The preferred collection of mounting brackets 16 further includes a rear cargo rack 164 shown in FIGS. 16 and 17. Similar to the front cargo rack 163, the rear cargo rack 164 includes a rear rack connecting frame 1641 and a rear platform skeleton 1642 supported by the rear rack connecting frame 1641. The rear platform skeleton 1642 preferably supports a rear cargo platform 252 shown in FIG. 1. The rear rack connecting frame 1641 can also be used to attach a rear bumper 165, shown in FIG. 17.

Figure 18:
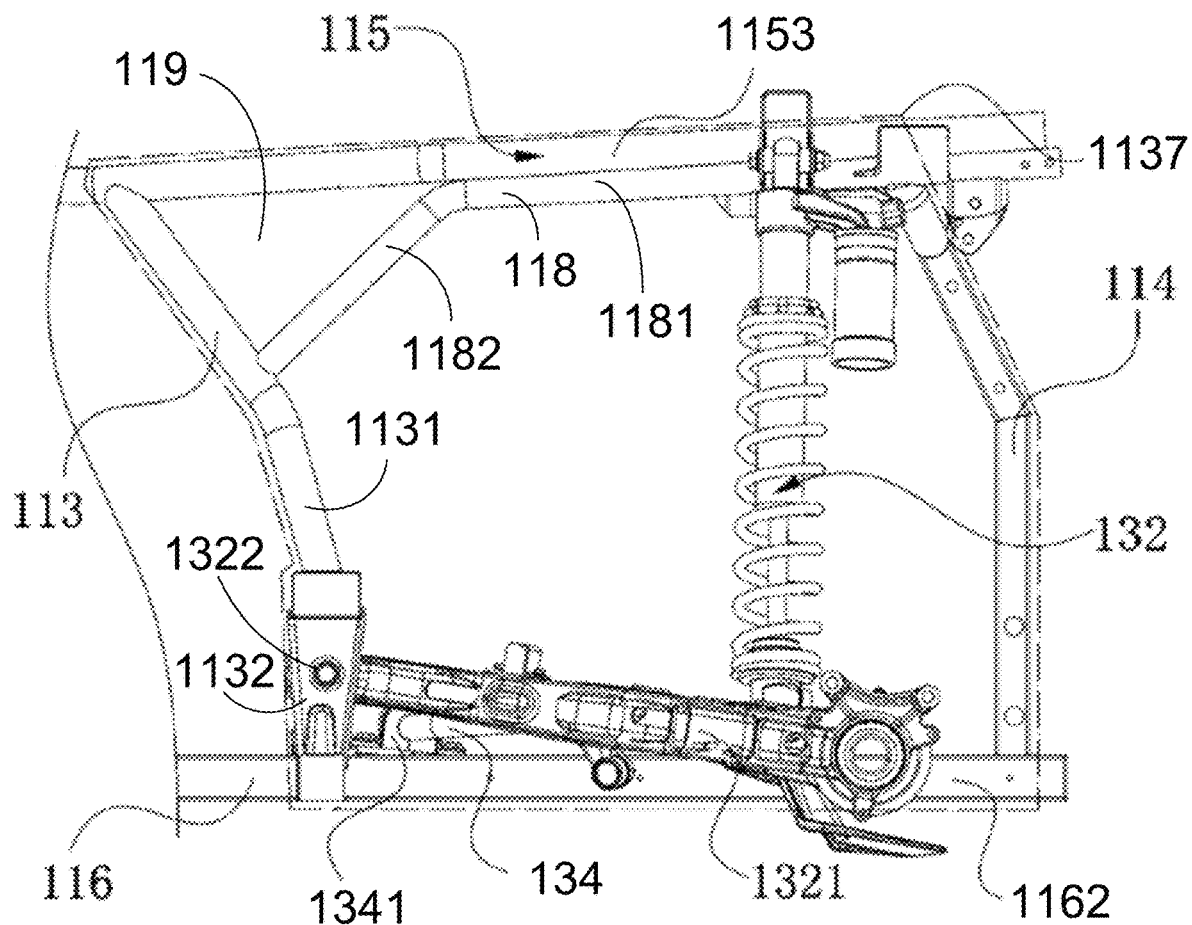
FIG. 18 is a left side view of a rear portion of the frame and rear suspension of the all-terrain vehicle of FIG. 1.
Figure 19:
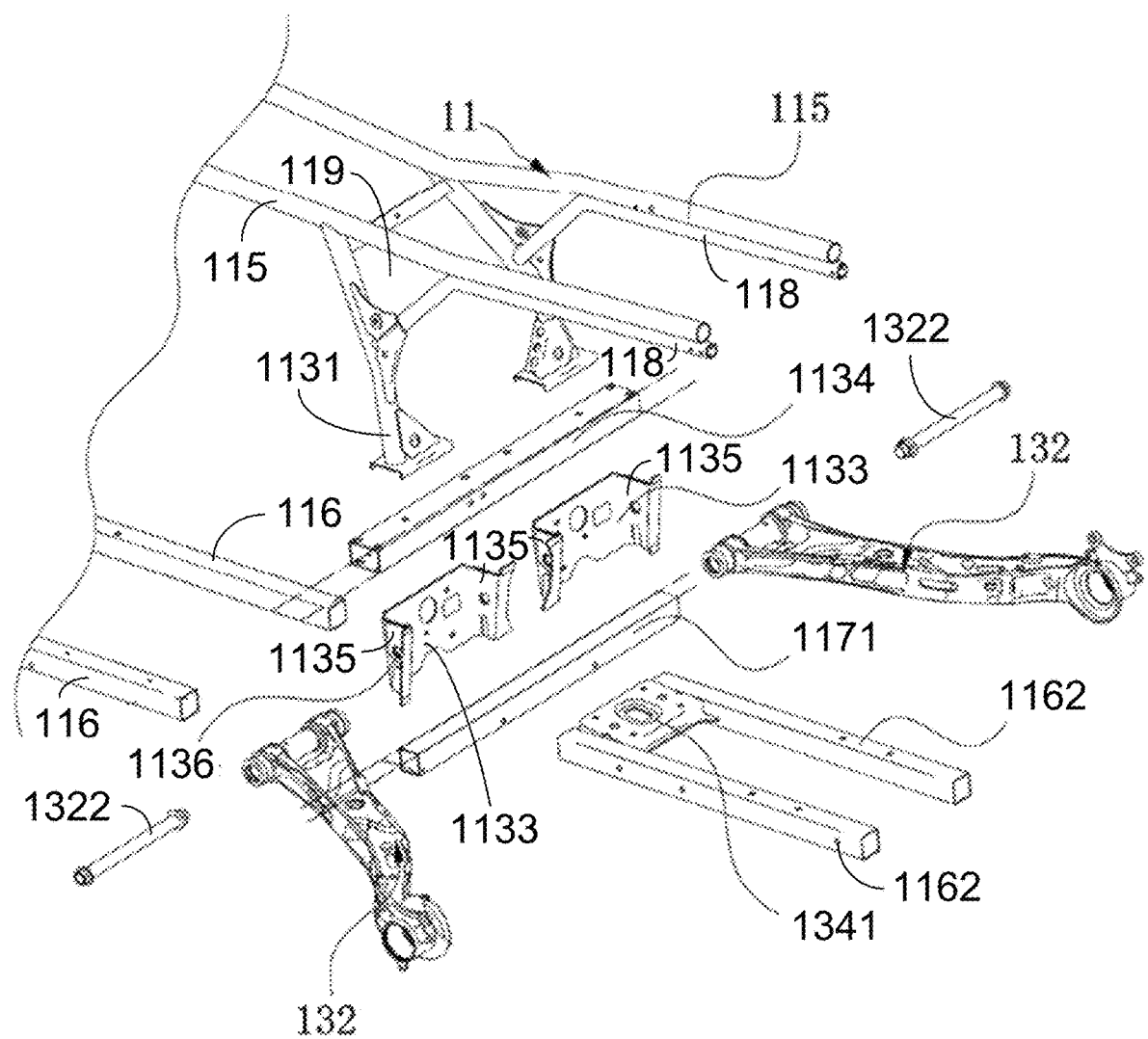
FIG. 19 is a rear left exploded perspective view of a rear portion of the frame and rear swing arms of the rear suspension of FIG. 18.

FIG. 18 shows a side view of the preferred rear suspension 132, showing its layout relative to the frame 11. The rear suspension 132 includes two (i.e., right and left) rear swing arms 1321. FIG. 19 is an exploded view showing how the rear swing arms 1321 attach in to the frame 11. The lower sheet metal 1132 of the mid-rear pillars 113 includes right and left swing arm mount plates 1133 connected between a mid-rear pillar crossbar 1134 and a mid-rear lower cross beam 1171. Each swing arm mount plate 1133 includes two longitudinally-extending plate flanges 1135 each with a pivot pin mount hole 1136. Each rear swing arm 1321 is pivotally connected to its swing arm mount plate 1133 by a swing arm pivot pin 1322 received in the pivot pin mount holes 1136. The pivot pin mount holes 1136 are centered at a mid elevation between the mid-rear pillar crossbar 1134 and the mid-rear lower cross beam 1171, just a short distance from each of the mid-rear pillar crossbar 1134 and the mid-rear lower cross beam 1171. That is, the pivot pin mount holes 1136 are located downward of the bottom surface of the mid-rear pillar crossbar 1134 and upward of the top surface of the mid-rear lower cross beam 1171. The pivot pin mount holes 1136 are also at a mid-longitude between the mid-rear pillar crossbar 1134 and the mid-rear lower cross beam 1171. That is, the pivot pin mount holes 1136 are located rearward of the most forward collective surface of the mid-rear pillar crossbar 1134 and the mid-rear lower cross beam 1171, and forward of the most rearward collective surface of the mid-rear pillar crossbar 1134 and the mid-rear lower cross beam 1171. Having the pivot pin mount holes 1136 at a mid elevation and mid longitude between the mid-rear pillar crossbar 1134 and the mid-rear lower cross beam 1171 helps to reduce bending moments on the lower sheet metal 1132 of the mid-rear pillar 113, allowing the frame 11 to better bear rear suspension forces.

Additionally, the cross-sectional area of the pivot pin mount holes 1136 is relatively small compared to the area of the longitudinally extending plate flanges 1135. Specifically, each pivot pin mount hole 1136 takes up from 4 to 8% of the area of its plate flange 1135, more preferably from 4.7 to 7% of the area of its plate flange 1135, and most preferably from 5 to 6.2% of the area of its plate flange 1135. By controlling the cross-sectional area of the pivot pin mount holes 1136 to be within these ranges, the connection between the rear swing arms 1321 and the lower sheet metal 1132 of the mid-rear pillar 113 can be more stable, and forces exerted by the rear swing arms 1321 on the mid-rear pillar 113 can be more uniform, so that the frame 11 is made stronger.

The preferred rear suspension 132 also includes a rear torsion bar 134, which is preferably mounted from a torsion bar mount plate 1341 extending transversely between the lower main beams 116 as part of or just behind the lower sheet metals 1132 of the mid-rear pillars 113. The various components of the rear suspension 132 are thus all mounted from a rear frame portion 1137 which includes frame components from the mid-rear pillars 113 rearward, i.e., the rear frame portion 1137 includes the mid-rear pillars 113, the rear pillars 114, the rear portions 1153 of the upper main beams 115 rearward of the mid-rear pillars 113, and rear portions 1162 of the lower main beams 116 rearward of the mid-rear pillars 113.

The preferred saddle 15 of the all-terrain vehicle 100 includes a driver's seat 151 and a readily detachable passenger's seat 152 which is further explained with reference to FIGS. 20-22. The driver's seat 151 is mounted on a top of the frame 11, with the passenger's seat 152 detachably mounted behind the driver's seat 151. The passenger's seat 152 includes a backrest 1521, a seat cushion 1522, a backrest frame 1523, a seat mounting bracket 1524 and a buffer mechanism 1525. The backrest 1521 covers the backrest frame 1523 to provide back support for the passenger. The seat cushion 1522 covers the seat mounting bracket 1524 to provide body support for the passenger. As further shown in FIG. 21, the backrest frame 1523 and the seat mounting bracket 1524 are connected via the buffer mechanism 1525.

The backrest frame 1523 includes a left backrest tube portion 1523*a* and a right backrest tube portion 1523*b* integrally joined by a top backrest tube portion 1523*c*. A plurality of backrest assembling points 1523d are welded to the tube portions 1523a, 1523b, 1523c spaced around the backrest frame 1523, used to mount the backrest 1521 on the backrest frame 1523. Some backrest assembling points 1523d extend outwardly from the tube portions 1523a, 1523b, 1523c, and some backrest assembling points 1523d extend inwardly from the tube portions 1523a, 1523b, 1523c, so as to achieve a more stable connection between the backrest 1521 and the backrest frame 1523.

The preferred seat mounting bracket 1524 includes a right seat rail 1524a, a left seat rail 1524b, a front seat rail 1524c, and a rear seat rail 1524d. The right and left seat rails 1524a, 1524b preferably include inwardly extending seat mount flanges 1524e. A plurality of seat cushion assembling points 1524f are provided on the seat mounting bracket 1524, such as on the right and left seat rails 1524a, 1524b and on the seat mount flanges 1524e. The plurality of seat cushion assembling points 1524f are used to mount the seat cushion 1522 to the seat mounting bracket 1524. Wide spacing between the various seat cushion assembling points 1524f helps achieve a more stable connection between the seat cushion 1522 and the seat mounting bracket 1524. If desired, weight-reducing holes 1524g can be provided on the right seat rail 1524a, the left seat rail 1524c, and the front seat rail 1524d.

Figure 20:
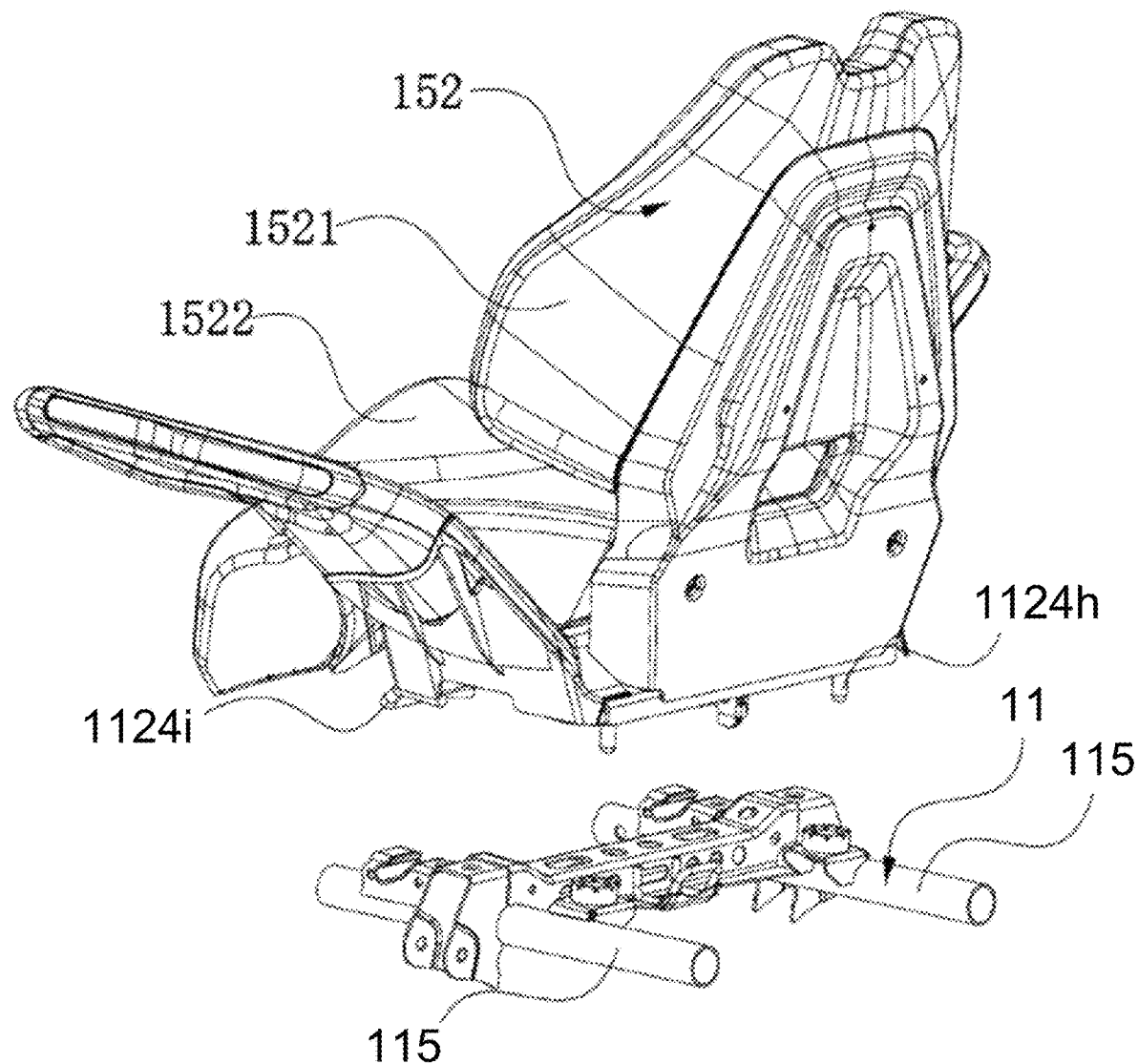
FIG. 20 is a rear left perspective view of the passenger's seat and a portion of the frame of the all-terrain vehicle of FIG. 1.

As best shown in FIG. 20, the preferred seat mounting bracket 1524 includes downwardly extending mounting pegs 1524h and downwardly extending mounting loops 1524i. The downwardly extending mounting pegs 1524h and downwardly extending mounting loops 1524i detachably mount the passenger's seat 152 to the frame 11 as known in the vehicle seat art.

The buffer mechanism 1525 is installed on the rear seat rail 1524d, connecting the backrest frame 1523 to the seat mounting bracket 1524. The buffer mechanism 1525 includes right and left angle limiting pivots 1525a and a spring plate 1525b mounted on the rear seat rail 1524f between the angle limiting pivots 1525a. The spring plate 1525b and the rear seat rail 1524d may be connected by bolts, riveting, or welding. The spring plate 1525b extends upwardly from the rear seat rail 1524d so as to interact with a seatback crossrod 1525c. When the angle limiting pivots 1525a allow the backrest frame 1523 to lean further rearwardly, the spring plate 1525b elastically counterbiases the backrest frame 1523 forwardly. The elastic buffering provided by the spring plate 1525b reduces impact forces and vibrations of the backrest 1521 on the passenger.

The right angle limiting pivot 1525a is better shown in FIG. 22. Each angle limiting pivot 1525a includes a pivot arm 1525d pivotally connected to a base flange 1525e such as with a pivot rivet 1525f. The seatback crossrod 1525c is preferably welded between the pivot arms 1525d of the right and left angle limiting pivots 1525a. Each pivot arm 1525d is fixed to a respective left and right backrest tube portion 1523a, 1523b such as by welding.

Each pivot arm 1525 includes a stop tab 1525g received within an arcuate slot 1525h of its base flange 1525e. Interference between the stop tab 1525g and the base flange 1525e when it reaches the end of the arcuate slot 1525h limits a seat pivot angle α. The maximum change of seat pivot angle α is within a range of 0 to 60°, more preferably within a range of 0 to 15° and most preferably within a range of 0 to 10°.

Figure 2:
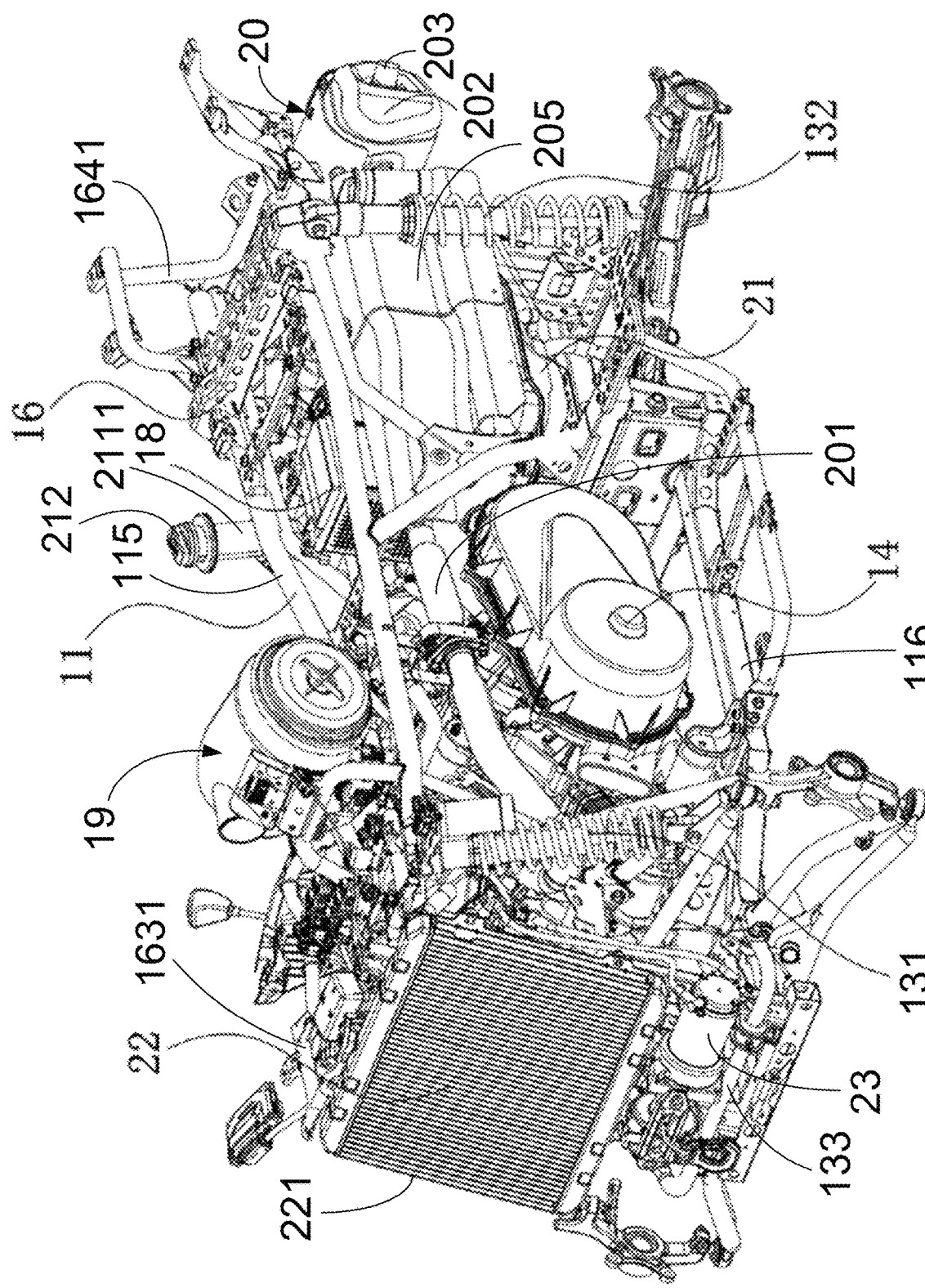
FIG. 2 is a front left perspective view of the frame and internal components of the all-terrain vehicle of FIG. 1.
Figure 23:
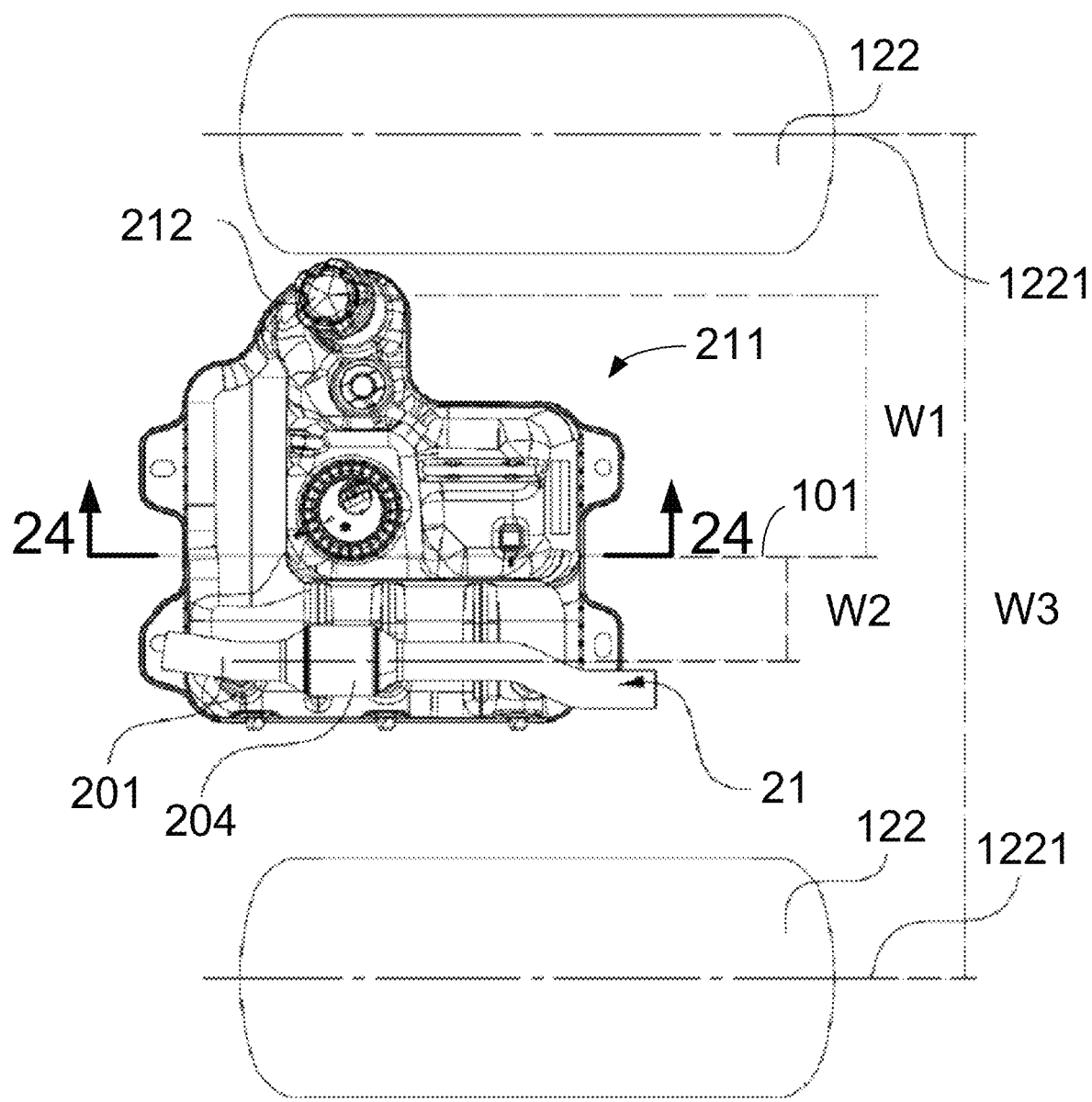
FIG. 23 is a top plan view of the fuel tank and a portion of the exhaust system relative to the rear wheels of the all-terrain vehicle of FIG. 1.

The fuel system 21 of the all-terrain vehicle 100 includes a fuel tank 211, the layout of which is further explained with reference to FIGS. 23 and FIG. 24. The fuel tank 211 has an integrally formed filler neck 2111 closed off by a gas cap 212 as also shown in FIG. 2. In the preferred embodiment, the gas cap 212 can be hand screwed onto and off of the filler neck 2111, and is accessible from outside the vehicle 100 for refueling of the vehicle 100. Specifically, the filler neck 2111 extends upwardly through the vehicle cover 25. As shown in FIG. 23, the preferred location for the gas cap 212 is on the right side of the longitudinal midplane 101, just rearward of the front of the right rear wheel 122. Meanwhile, the exhaust system 20 includes an exhaust pipe 201 running longitudinally between the prime mover assembly 14 and a muffler 202 and tailpipe 203 (all three shown only in FIGS. 1 and 2). The exhaust pipe 201 includes a catalytic converter 204. The exhaust pipe 201 and catalytic converter 204 get quite hot during running of the vehicle 100, and may be protected from inadvertent contact behind a heat shield 205 shown in FIG. 2 The exhaust pipe 201 and its catalytic converter 204 are positioned on the opposite side of the longitudinal midplane 101 from the gas cap 212 and filler neck 2111. Thus, with the gas cap 212 is on the right side of the longitudinal midplane 101, the exhaust pipe 201 and its catalytic converter 204 are on the left side of the longitudinal midplane 101. Positioning the gas cap 212 and filler neck 2111 far from the exhaust pipe 201 and catalytic converter 204 helps to minimize the likelihood of fuel spilling onto the exhaust pipe 201 or catalytic converter 204 during refueling of the vehicle 100.

The preferred layout of the exhaust system 20 and fuel system 21 are more specifically explained as shown in FIG. 23. The filler neck 2111 defines a filler neck axis 2112. A filler neck offset W1 is defined as a lateral distance between the longitudinal midplane 101 and the point that the filler neck axis 2112 passes through the vehicle cover 25. A catalytic converter offset W2 is defined as a lateral distance between the longitudinal midplane 101 and a center line of the catalytic converter 204. The rear wheels 122 each have a rear wheel midplane 1221, and a rear wheel track width W3 is defined as a lateral distance between the two rear wheel midplanes 1221. A filler neck offset ratio W1/W3 of the filler neck offset W1 divided by the rear wheel track width W3 is preferably in the range of 0.21 to 0.41, more preferably in the range of 0.24 to 0.38, and most preferably in the range of 0.27 to 0.34. A catalytic converter offset ratio W2/W3 of the catalytic converter offset W2 divided by the rear wheel track width W3 is preferably in the range of 0.08 to 0.17, more preferably in the range of 0.9 to 0.15, and most preferably in the range of 0.11 to 0.14. Properly selecting the filler neck offset ratio W1/W3 and the catalytic converter offset ratio W2/W3 leads to a safer vehicle while still maintaining an ergonomic filler neck position and a relatively direct exhaust pipe run.

Figure 24:
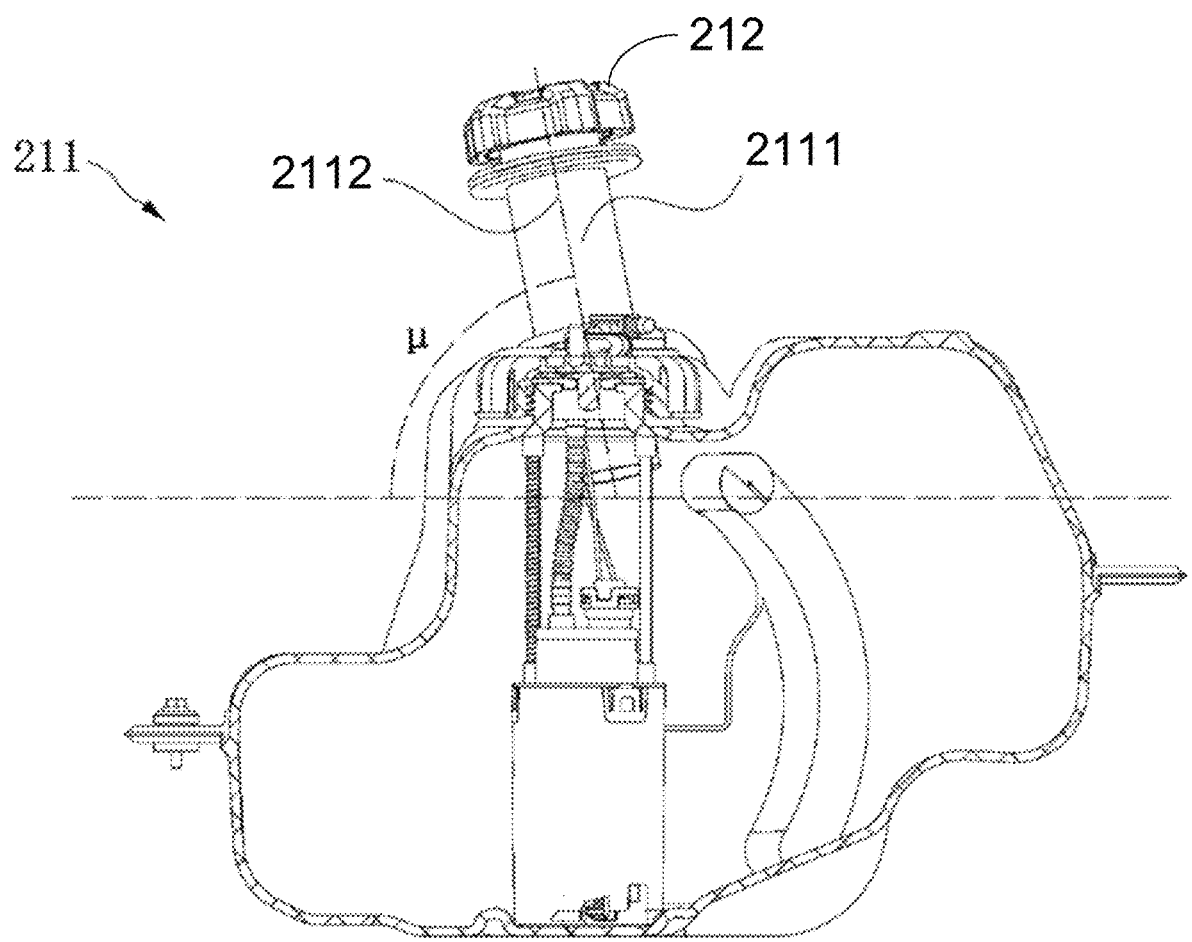
FIG. 24 is a left side cross-sectional view of the fuel tank of FIG. 23, taken along cut lines 24-24

The filler neck axis 2112 preferably leans forwardly as shown in FIG. 24. Specifically, a filler neck forward lean angle μ formed between the filler neck axis 2112 and horizontal is an acute angle with a value greater than or equal to 35° and less than 90°. The filler neck 2111 is preferably circumscribed by the vehicle cover 25, and selecting a filler neck forward lean angle μ within this range allows for easier design of the vehicle cover 25 for circumscribing the filler neck 2111, thereby making it less likely that the gas cap 212 will be contacted when traversing narrow trail conditions. Further, by selecting a filler neck forward lean angle μ within this range, when the all-terrain vehicle 100 is refueled, fuel can easily enter the filler neck 2111.

Figure 25:
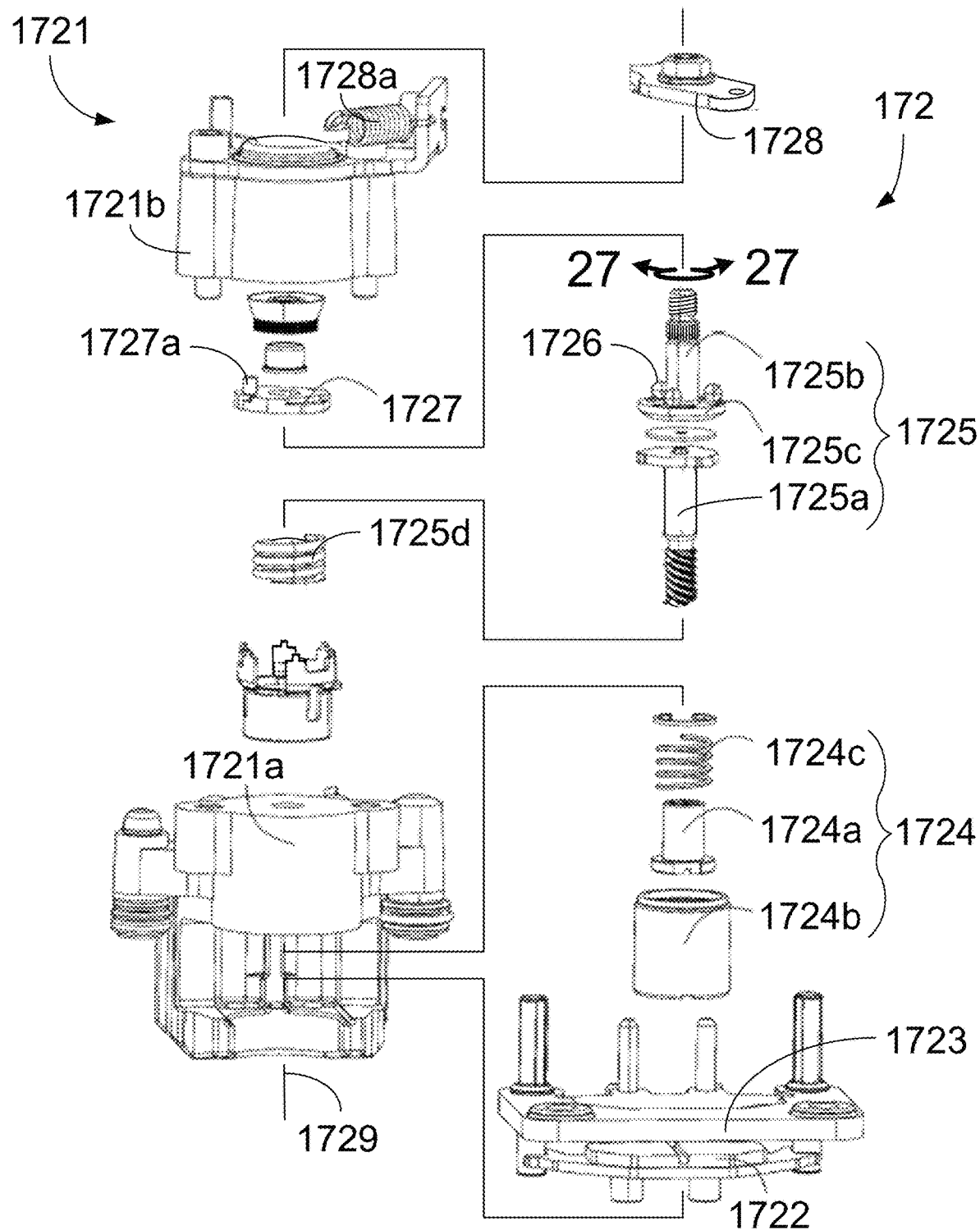
FIG. 25 is an exploded perspective view of a caliper assembly of the all-terrain vehicle of FIG. 1.
Figure 26:
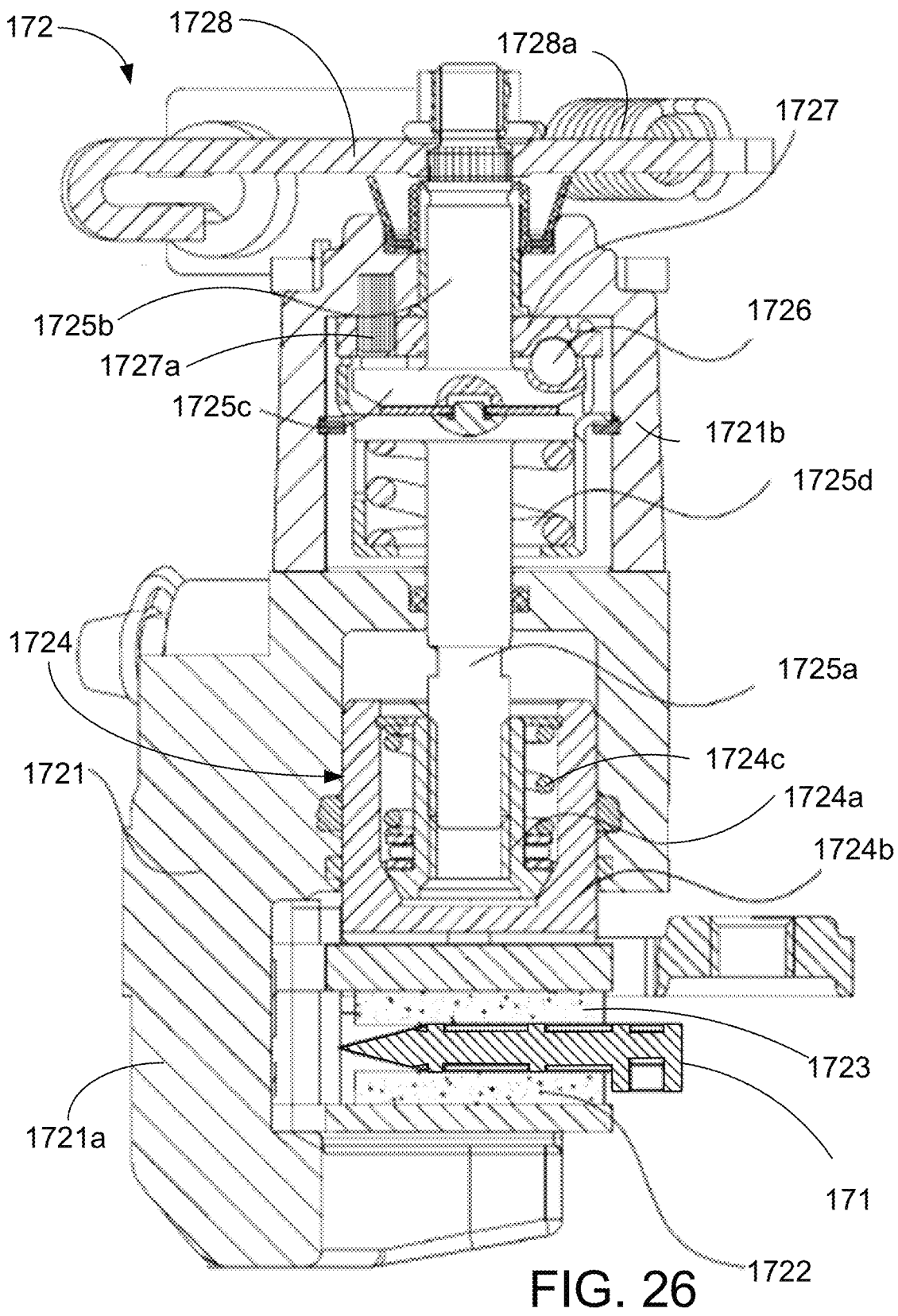
FIG. 26 is a cross-sectional view of the caliper assembly of FIG. 25.

The preferred brake system 17 includes a rotor or brake disc 171 rotating as part of each of the four wheels 12, and a caliper assembly 172 mounted to push against and brake each brake disc 171. FIGS. 25 and 26 show the preferred caliper assembly 172, which incorporates dual action to provide braking force. The caliper assembly 172 includes a caliper body 1721 with a stationary (relative to the caliper body 1721) brake pad 1722, a moving brake pad 1723, a piston mechanism 1724, a translating/rotating push mechanism 1725, balls 1726, a fixed raceway 1727, and a crank 1728. The caliper body 1721 is provided in two primary caliper body parts 1721a, 1721b for ease of assembly. The two brake pads 1722, 1723 are supported within the caliper body 1721 for braking the rotating brake disc 171. The piston mechanism 1724 is arranged in the caliper body 1721 for moving at least one of two brake pads 1722, 1723 causing friction against the rotating brake disc 171. The translating/rotating push mechanism 1725 is arranged in the caliper body 1721, and the translating/rotating push mechanism 1725 is threadedly connected to the piston mechanism 1724, so that rotation of the translating/rotating push mechanism 1725 advances the piston mechanism 1724 in translation to cause relative movement of at least the moving brake pad 1723. The fixed raceway 1727 is fixedly connected to the caliper body 1721. For instance, the fixed raceway 1727 can include a pin 1727a close to the caliper body 1721, and a surface of the caliper body 1721 contacting the fixed raceway 1727 can be provided with a hole (not shown). The pin 1727a can be inserted into the hole of the caliper body 1721 to achieve fixation of the fixed raceway 1727. The crank 1728 is pivotally attached to the caliper body 1721 for rotation about an axis 1729, acting against a crank tension spring 1728a.

When the driver actuates the brake system 17, the crank 1728 is caused by the brake system 17 (such as by a brake cable, not shown) to pivot about its axis 1729 for a limited amount, such as by about 90°. The crank 1728 is splined to the translating/rotating push mechanism 1725, and pivoting of the crank 1728 causes the translating/rotating push mechanism 1725 to similarly pivot (e.g.) 90° about the axis 1729, while the splined connection still allows the translating/rotating push mechanism 1725 to translate along the axis 1729. Specifically, the translating/rotating push mechanism 1725 includes an externally threaded screw rod 1725a which after assembly is keyed or otherwise fixed relative to a raceway roller 1725b. The raceway roller 1725b provides a moving raceway 1725c.

Figure 27:
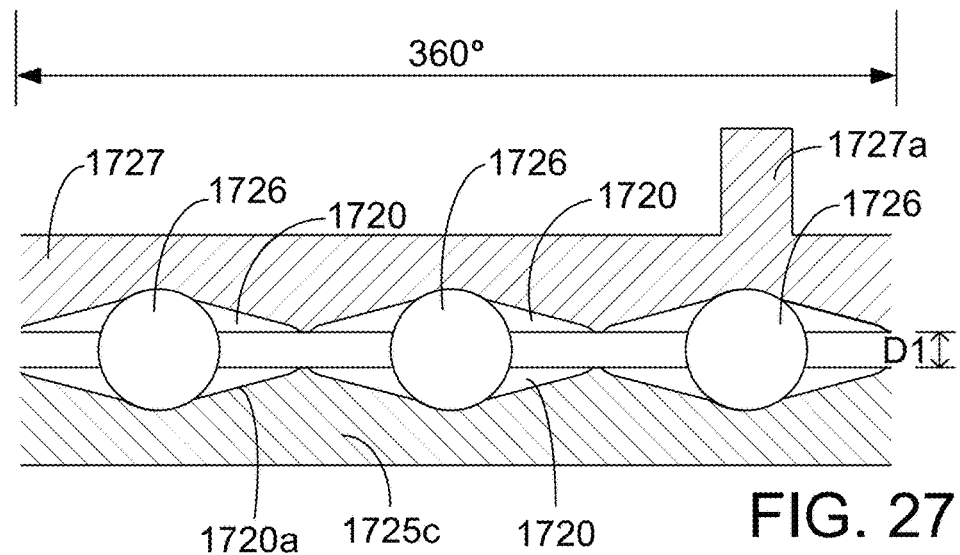
FIG. 27 is a circumferential cross-sectional view of the raceways and balls of the caliper assembly of FIGS. 25 and 26 in a rest state, taken along cut circle 27-27 in FIG. 25.
Figure 28:
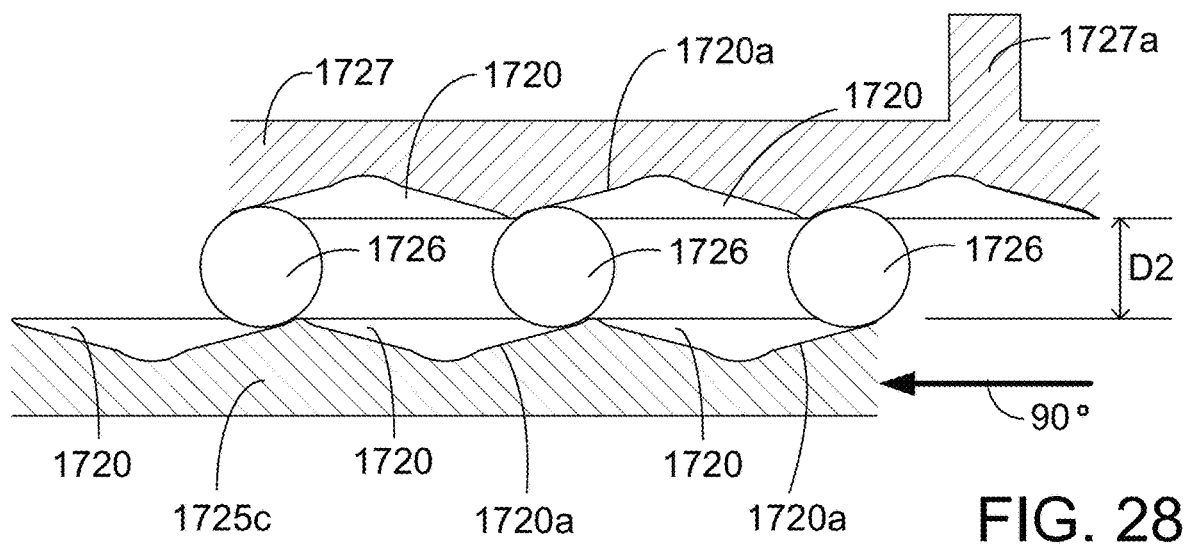
FIG. 28 is the circumferential cross-sectional of FIG. 27 in a fully-braking state.
Figure 29:
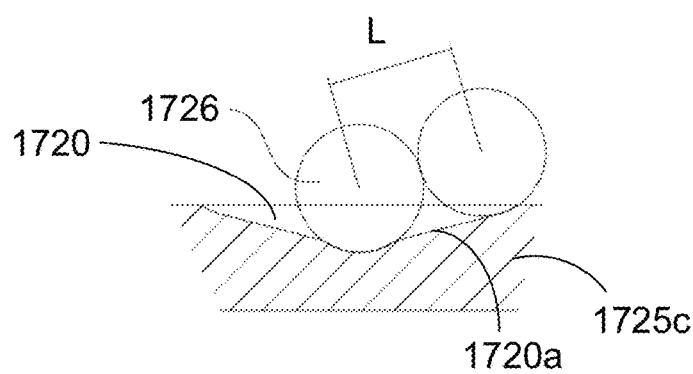
FIG. 29 is a cross-sectional view showing travel of one of the balls relative to the moving raceway between FIGS. 27 and 28.

The action of the balls 1726 relative to the fixed and moving raceways 1727, 1725c is further explained relative to FIGS. 27 to 29. Each of the fixed and moving raceways 1727, 1725c have a recess 1720 for each of the balls 1726. The recesses 1720 are sloped relative to the rotational direction. When the crank 1728 is in a non-braking position, the recesses 1720 of the moving raceway 1725c line up opposite the recesses 1720 of the fixed raceway 1727. When the crank 1728 is in the non-braking position, the balls 1726 are in a rest position in the aligned recesses 1720. With the balls 1726 in the aligned recesses 1720, the balls 1726 hold the moving raceway 1725c a rest distance D1 away from the fixed raceway 1727. When the crank 1728 is pivoted (such as up to 90°) to a braking position, the moving raceway 1725c rotates the same amount about the axis 1729 relative to the fixed raceway 1727. The relative rotation requires the balls 1726 to climb at least one of the slopes, but more preferably friction between each ball 1726 and the raceways 1727, 1725c causes the ball 1726 to rotate and climb the slopes of both the raceways 1727, 1725c. Climbing of the balls 1726 generates thrust and axial displacement, thereby increasing the distance between the fixed raceway 1727 and the moving raceway 1725c. As the balls 1726 reach the peaks of the raceway slopes, the moving raceway 1725c is a fully braked distance D2 away from the fixed raceway 1727. Thus, pivoting of the crank 1728 from a non-braking position to a fully braked position not only causes the translating/rotating push mechanism 1725 to pivot by an equal rotational angle amount, but also causes the translating/rotating push mechanism 1725 to translate by a translation amount D2−D1 of the fully braked distance D2 minus the rest distance D1.

The piston mechanism 1724 includes an internally threaded sleeve 1724a and a piston 1724b. The screw rod 1725a of the translating/rotating push mechanism 1725 is threadedly received in the threaded sleeve 1724a of the piston mechanism 1724. The threaded sleeve 1724a has an exterior shape which prevents rotation but allows sliding translation. Translation of the threaded sleeve 1724a causes the piston 1724b to translate by an equal amount. Translation of the screw rod 1725a causes the threaded sleeve 1724a to translate by an equal amount. Pivoting rotation of the screw rod 1725a causes the threaded sleeve 1724a to further translate in accordance with the pitch angle of the screw threads. Pivoting rotation of the translating/rotating push mechanism 1725 thus moves the piston 1724b in two ways, both by the action of the balls 1726 and by the action of the threads.

The piston 1724b is connected to or abuts against the moving brake pad 1723. Movement of the piston 1724b drives at least the moving brake pad 1723 for braking of the vehicle 100. Through the above-described dual action arrangement, the larger output force of the piston 1724b can be achieved through a smaller pivoting of the crank 1728 and a smaller travel of the balls 1726, thereby improving a transmission efficiency of the caliper 172. Return compression springs 1724c, 1725d are provided biasing against both of the dual actions, so all the components in the caliper 172 reliably return to the rest position after the driver stops braking.

The stroke that each of the balls 1726 travels from the non-braking rest position to a fully braked position is called out in FIG. 29 as L. The piston 1724b provides a fully braked output force F on the two brake pads 1722, 1723. A braking ratio F/L of the output force F of the piston 1724b to the stroke L of the balls 1726 is preferably in the range of 15 to 29 kN/mm, more preferably in the range of 17 to 27 kN/mm, and even more preferably in the range of 20 to 25 kN/mm, and most preferably a value of 22 kN/mm.

The above-mentioned embodiments are only used to illustrate the present invention, rather than to serve as limitations, which are solely limited by the appended claims. Although such embodiments are described in detail, those skilled in the art understand that they can still modify the disclosed technical solutions within the protection scope of the present application, or replace some of the technical features therein by equivalents; and these modifications or replacements do not deviate from the spirit and scope of the present invention, and should all be included.

What is claimed is:
1. An all-terrain vehicle, comprising:
a frame;
four wheels comprising a pair of front wheels and a pair of rear wheels;
a suspension system comprising a front suspension and a rear suspension, the pair of front wheels being connected to the frame through the front suspension, and the pair of rear wheels being connected to the frame through the rear suspension; and a prime mover assembly at least partially arranged on the frame;
wherein the frame comprises:
right and left upper main beams, arranged on an upper side of the frame and running longitudinally;
right and left lower main beams, arranged below the respective right and left upper main beams;
right and left pillars running between and connecting the respective right and left lower main beams to the respective right and left upper main beams; and
right and left auxiliary main beams, extending upwardly from at least one of the respective right and left pillars, at least a portion of each auxiliary main beam running longitudinally and connecting to the respective upper main beam over a length of at least twice a thickness of the auxiliary main beam.

2. The all-terrain vehicle of claim 1, wherein the right and left upper main beams define a front upper beam spacing and a rear upper beam spacing, wherein an upper beam spacing ratio of the front upper beam spacing to the rear upper beam spacing is greater than or equal to 0.3 and less than 1.

3. The all-terrain vehicle according to claim 1, wherein a portion of each auxiliary main beam, a portion of the respective upper main beam and a portion of the respective pillar cooperatively define a triangle.

4. The all-terrain vehicle according to claim 1, wherein each of the right and left auxiliary main beams comprises a longitudinal section and an integrally formed front tube section, the front tube section extending at an angle in the range from 120 to 170° relative to the longitudinal section.

5. The all-terrain vehicle according to claim 1, wherein the right and left pillars comprise right and left front pillars, right and left mid-front pillars, right and left mid-rear pillars and right and left rear pillars all running between and connecting the respective right and left lower main beams to the respective right and left upper main beams, wherein the right and left auxiliary main beams extend upwardly from the respective right and left mid-rear pillars.

6. The all-terrain vehicle according to claim 5, wherein the right and left front pillars each comprise an upper tube connected to the right and left upper main beams and lower sheet metal connected to the right and left lower main beams, and further comprising a front bracket connected to the lower sheet metal.

7. The all-terrain vehicle according to claim 6, wherein the front bracket supports a winch and a radiator assembly both forward of the right and left front pillars.

8. The all-terrain vehicle according to claim 7, further comprising a front cargo rack having a front rack connecting frame connected to the right and left upper main beams of the frame, the front rack connecting frame comprising radiator mount flanges.

9. The all-terrain vehicle of claim 6, wherein the front bracket comprises an upper arm and a lower arm extending downwardly and rearwardly from the upper arm, wherein both the upper arm and the lower arm are connected to the lower sheet metal of the right and left front pillars.

10. The all-terrain vehicle of claim 6, wherein the front bracket occupies from 9 to 18% of a frontal area of the all-terrain vehicle.

11. The all-terrain vehicle according to claim 5, wherein the right and left mid-rear pillars each comprise an upper tube connected to the right and left upper main beams and lower sheet metal connected to the right and left lower main beams, wherein the lower sheet metal comprises right and left swing arm mount plates, and wherein the rear suspension comprises right and left swing arms pivotally mounted to the respective swing arm mount plate.

12. The all-terrain vehicle according to claim 11, wherein the right and left swing arm mount plates are connected to extend above a mid-rear lower cross beam and below a mid-rear pillar crossbar, wherein the right and left swing arm mount plates comprise longitudinally-extending plate flanges defining pivot pin mount holes, and wherein the pivot pin mount holes are located downward of a bottom surface of the mid-rear pillar crossbar, upward of a top surface of the mid-rear lower cross beam, rearward of a most forward collective surface of the mid-rear pillar crossbar and the mid-rear lower cross beam, and forward of a most rearward collective surface of the mid-rear pillar crossbar and the mid-rear lower cross beam.

13. The all-terrain vehicle according to claim 11, wherein the lower sheet metal further comprises a rear torsion arm mount plate.

14. The all-terrain vehicle according to claim 1, wherein the all-terrain vehicle further comprises:
a cooling system, at least partially arranged on the frame, wherein the cooling system comprises a radiator assembly having a cooling fan and a fan cover, wherein the fan cover is integrally formed so as to comprise:
a tank connection flange for supporting a coolant overflow tank;
a hose clamp for supporting a coolant overflow hose; and
a harness clamp for supporting an electrical cable for the cooling fan.

15. The all-terrain vehicle according to claim 1, wherein the all-terrain vehicle further comprises:
a driver's seat mounted on a top of the frame; and
a passenger's seat mounted behind the driver's seat, the passenger's seat comprising a backrest frame connected to a seat mounting bracket by right and left angle pivots which allow the backrest frame to change its lean angle relative to the seat mounting bracket, and a spring plate which elastically counterbiases the backrest frame forwardly.

16. The all-terrain vehicle according to claim 1, wherein the all-terrain vehicle further comprises;
a braking system comprising a brake caliper for braking one of the four wheels, the brake caliper comprising:
a movable brake pad;
a piston for moving the movable brake pad;
a translating/rotating push mechanism, the translating/rotating push mechanism having screw threads threadingly engaged relative to the piston and a raceway having a plurality of sloped recesses; and
a plurality of balls against the raceway, with one ball for each sloped recess;
wherein pivoting rotation of the translating/rotating push mechanism moves the piston both by action of the balls relative to the sloped recesses and by the action of the screw threads.

17. An all-terrain vehicle, comprising:
a frame;
four wheels comprising a pair of front wheels and a pair of rear wheels;
a suspension system comprising a front suspension and a rear suspension, the pair of front wheels being connected to the frame through the front suspension, and the pair of rear wheels being connected to the frame through the rear suspension; and
a prime mover assembly at least partially arranged on the frame;

wherein the frame comprises:
right and left upper main beams, arranged on an upper side of the frame and running longitudinally;
right and left lower main beams, arranged below the respective right and left upper main beams;
right and left pillars running between and connecting the respective right and left lower main beams to the respective right and left upper main beams; and
right and left auxiliary main beams, each of the auxiliary main beams having a tube portion extending at an angle relative to a longitudinal portion, the longitudinal portion connecting to the respective upper main beam over its length, wherein the tube portion extends at an angle in the range from 120 to 170° relative to the longitudinal portion.

18. The all-terrain vehicle of claim 17, wherein the tube portion of each auxiliary main beam connects to a respective pillar and a mid-height of the respective pillar.

19. The all-terrain vehicle of claim 18, wherein the tube portion, the respective pillar and the respective upper main beam collectively define a triangle.

20. An all-terrain vehicle, comprising:
a frame;
four wheels comprising a pair of front wheels and a pair of rear wheels;
a suspension system comprising a front suspension and a rear suspension, the pair of front wheels being connected to the frame through the front suspension, and the pair of rear wheels being connected to the frame through the rear suspension; and
a prime mover assembly at least partially arranged on the frame;
wherein the frame comprises:
right and left upper main beams, arranged on an upper side of the frame and running longitudinally;
right and left lower main beams, arranged below the respective right and left upper main beams;
right and left pillars running between and connecting the respective right and left lower main beams to the respective right and left upper main beams, wherein the right and left pillars comprise right and left front pillars, right and left mid-front pillars, right and left mid-rear pillars and right and left rear pillars all running between and connecting the respective right and left lower main beams to the respective right and left upper main beams; and
right and left auxiliary main beams, each of the auxiliary main beams having a tube portion extending at an angle relative to a longitudinal portion, the tube portion extending upwardly from a mid-height of the respective mid-rear pillar, the longitudinal portion connecting to the respective upper main beam over its length.

* * * * *